United States Patent
Park et al.

(10) Patent No.: US 12,395,818 B2
(45) Date of Patent: Aug. 19, 2025

(54) WEB SERVICES FOR SMART ENTITY MANAGEMENT FOR SENSOR SYSTEMS

(71) Applicant: Tyco Fire & Security GmbH, Nauhausen am Rheinfall (CH)

(72) Inventors: Youngchoon Park, Brookfield, WI (US); Sudhi R. Sinha, Milwaukee, WI (US); Vaidhyanathan Venkiteswaran, Brookfield, WI (US); Erik S. Paulson, Madison, WI (US); Vijaya S. Chennupati, Brookfield, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/728,047

(22) Filed: Apr. 25, 2022

(65) Prior Publication Data

US 2022/0327111 A1    Oct. 13, 2022

Related U.S. Application Data

(63) Continuation of application No. 16/143,164, filed on Sep. 26, 2018, now Pat. No. 11,314,726.
(Continued)

(51) Int. Cl.
*G06F 16/20* (2019.01)
*G06F 16/22* (2019.01)
(Continued)

(52) U.S. Cl.
CPC .......... *H04W 4/38* (2018.02); *G06F 16/2228* (2019.01); *G06F 16/2358* (2019.01);
(Continued)

(58) Field of Classification Search
None
See application file for complete search history.

(56) References Cited

U.S. PATENT DOCUMENTS

| 5,301,109 A | 4/1994 | Landauer et al. |
| 5,446,677 A | 8/1995 | Jensen et al. |

(Continued)

FOREIGN PATENT DOCUMENTS

| AU | 2019226217 A1 | 11/2020 |
| AU | 2019226264 A1 | 11/2020 |

(Continued)

OTHER PUBLICATIONS

Balaji et al, "Brick: Metadata schema for portable smart building applications," Applied Energy, 2018 20 pages.
(Continued)

*Primary Examiner* — Belix M Ortiz Ditren
(74) *Attorney, Agent, or Firm* — Foley & Lardner LLP

(57) ABSTRACT

One or more non-transitory computer readable media contain program instructions that, when executed by one or more processors, cause the one or more processors to perform operations including generating a database of interconnected smart entities. The smart entities include sensor object entities representing each of the plurality of sensors and data entities representing measurements received from the sensors. The smart entities are interconnected by relational objects indicating relationships between the smart entities. The instructions cause the one or more processors to receive a new measurement from a first sensor, identify a first data entity from a relational object for the first sensor, the first data entity including a plurality of past measurements received from the first sensor, and modify the first data entity within the database of smart entities to include the new measurement received from the first sensor.

19 Claims, 8 Drawing Sheets

Related U.S. Application Data

(60) Provisional application No. 62/611,962, filed on Dec. 29, 2017, provisional application No. 62/588,114, filed on Nov. 17, 2017, provisional application No. 62/588,179, filed on Nov. 17, 2017, provisional application No. 62/588,190, filed on Nov. 17, 2017, provisional application No. 62/564,247, filed on Sep. 27, 2017.

(51) Int. Cl.
| | | |
|---|---|---|
| *G06F 16/23* | (2019.01) | |
| *G06F 16/28* | (2019.01) | |
| *G06F 16/901* | (2019.01) | |
| *H04L 41/02* | (2022.01) | |
| *H04L 41/12* | (2022.01) | |
| *H04L 41/344* | (2022.01) | |
| *H04L 67/02* | (2022.01) | |
| *H04L 67/10* | (2022.01) | |
| *H04L 67/60* | (2022.01) | |
| *H04L 69/08* | (2022.01) | |
| *H04W 4/38* | (2018.01) | |
| *G06F 9/54* | (2006.01) | |
| *H04L 41/142* | (2022.01) | |

(52) U.S. Cl.
CPC ........ *G06F 16/2379* (2019.01); *G06F 16/288* (2019.01); *G06F 16/9024* (2019.01); *H04L 41/024* (2013.01); *H04L 41/12* (2013.01); *H04L 41/344* (2022.05); *H04L 67/02* (2013.01); *H04L 67/10* (2013.01); *H04L 67/60* (2022.05); *H04L 69/08* (2013.01); *G06F 9/547* (2013.01); *H04L 41/142* (2013.01)

(56) References Cited

U.S. PATENT DOCUMENTS

| | | |
|---|---|---|
| 5,581,478 A | 12/1996 | Cruse et al. |
| 5,812,962 A | 9/1998 | Kovac |
| 5,960,381 A | 9/1999 | Singers et al. |
| 5,973,662 A | 10/1999 | Singers et al. |
| 6,014,612 A | 1/2000 | Larson et al. |
| 6,031,547 A | 2/2000 | Kennedy |
| 6,134,511 A | 10/2000 | Subbarao |
| 6,157,943 A | 12/2000 | Meyer |
| 6,163,781 A | 12/2000 | Wess |
| 6,285,966 B1 | 9/2001 | Brown et al. |
| 6,363,422 B1 | 3/2002 | Hunter et al. |
| 6,385,510 B1 | 5/2002 | Hoog et al. |
| 6,389,331 B1 | 5/2002 | Jensen et al. |
| 6,401,027 B1 | 6/2002 | Xu et al. |
| 6,437,691 B1 | 8/2002 | Sandelman et al. |
| 6,477,518 B1 | 11/2002 | Li et al. |
| 6,487,457 B1 | 11/2002 | Hull et al. |
| 6,493,755 B1 | 12/2002 | Hansen et al. |
| 6,577,323 B1 | 6/2003 | Jamieson et al. |
| 6,609,132 B1* | 8/2003 | White ................... G06F 16/288 |
| 6,626,366 B2 | 9/2003 | Kayahara et al. |
| 6,629,097 B1 | 9/2003 | Keith |
| 6,646,660 B1 | 11/2003 | Patty |
| 6,704,016 B1 | 3/2004 | Oliver et al. |
| 6,732,540 B2 | 5/2004 | Sugihara et al. |
| 6,764,019 B1 | 7/2004 | Kayahara et al. |
| 6,782,385 B2 | 8/2004 | Natsumeda et al. |
| 6,813,532 B2 | 11/2004 | Eryurek et al. |
| 6,816,811 B2 | 11/2004 | Seem |
| 6,823,680 B2 | 11/2004 | Jayanth |
| 6,826,454 B2 | 11/2004 | Sulfstede |
| 6,865,511 B2 | 3/2005 | Frerichs et al. |
| 6,925,338 B2 | 8/2005 | Eryurek et al. |
| 6,986,138 B1 | 1/2006 | Sakaguchi et al. |
| 7,031,880 B1 | 4/2006 | Seem et al. |
| 7,401,057 B2 | 7/2008 | Eder |
| 7,552,467 B2 | 6/2009 | Lindsay |
| 7,627,544 B2 | 12/2009 | Chkodrov et al. |
| 7,657,540 B1 | 2/2010 | Bayliss |
| 7,818,249 B2 | 10/2010 | Lovejoy et al. |
| 7,889,051 B1 | 2/2011 | Billig et al. |
| 7,917,570 B2 | 3/2011 | Ishii |
| 7,996,488 B1 | 8/2011 | Casabella et al. |
| 8,078,330 B2 | 12/2011 | Brickfield et al. |
| 8,104,044 B1 | 1/2012 | Scofield et al. |
| 8,229,470 B1 | 7/2012 | Ranjan et al. |
| 8,401,991 B2 | 3/2013 | Wu et al. |
| 8,495,745 B1 | 7/2013 | Schrecker et al. |
| 8,503,330 B1 | 8/2013 | Choong et al. |
| 8,516,016 B2 | 8/2013 | Park et al. |
| 8,532,808 B2 | 9/2013 | Drees et al. |
| 8,532,839 B2 | 9/2013 | Drees et al. |
| 8,600,556 B2 | 12/2013 | Nesler et al. |
| 8,620,841 B1 | 12/2013 | Filson et al. |
| 8,635,182 B2 | 1/2014 | Mackay |
| 8,682,921 B2 | 3/2014 | Park et al. |
| 8,731,724 B2 | 5/2014 | Drees et al. |
| 8,737,334 B2 | 5/2014 | Ahn et al. |
| 8,738,334 B2 | 5/2014 | Jiang et al. |
| 8,751,487 B2 | 6/2014 | Byrne et al. |
| 8,788,097 B2 | 7/2014 | Drees et al. |
| 8,805,995 B1 | 8/2014 | Oliver |
| 8,843,238 B2 | 9/2014 | Wenzel et al. |
| 8,874,071 B2 | 10/2014 | Sherman et al. |
| 8,941,465 B2 | 1/2015 | Pineau et al. |
| 8,990,127 B2 | 3/2015 | Taylor |
| 9,070,113 B2 | 6/2015 | Shafiee et al. |
| 9,116,978 B2 | 8/2015 | Park et al. |
| 9,185,095 B1 | 11/2015 | Moritz et al. |
| 9,189,527 B2 | 11/2015 | Park et al. |
| 9,196,009 B2 | 11/2015 | Drees et al. |
| 9,229,966 B2 | 1/2016 | Aymeloglu et al. |
| 9,286,582 B2 | 3/2016 | Drees et al. |
| 9,311,807 B2* | 4/2016 | Schultz ............... G06F 13/4221 |
| 9,344,751 B1 | 5/2016 | Ream et al. |
| 9,354,968 B2 | 5/2016 | Wenzel et al. |
| 9,507,686 B2 | 11/2016 | Horn et al. |
| 9,524,594 B2 | 12/2016 | Ouyang et al. |
| 9,558,196 B2 | 1/2017 | Johnston et al. |
| 9,652,813 B2 | 5/2017 | Gifford et al. |
| 9,658,607 B2 | 5/2017 | Coogan et al. |
| 9,753,455 B2 | 9/2017 | Drees |
| 9,800,648 B2 | 10/2017 | Agarwal et al. |
| 9,811,249 B2 | 11/2017 | Chen et al. |
| 9,817,383 B1 | 11/2017 | Sinha et al. |
| 9,838,844 B2 | 12/2017 | Emeis et al. |
| 9,886,478 B2 | 2/2018 | Mukherjee |
| 9,948,359 B2 | 4/2018 | Horton |
| 10,015,069 B1 | 7/2018 | Blank |
| 10,055,114 B2 | 8/2018 | Shah et al. |
| 10,055,206 B2 | 8/2018 | Park et al. |
| 10,116,461 B2 | 10/2018 | Fairweather et al. |
| 10,169,454 B2 | 1/2019 | Ait-Mokhtar et al. |
| 10,170,123 B2 | 1/2019 | Orr et al. |
| 10,171,297 B2 | 1/2019 | Stewart et al. |
| 10,171,586 B2 | 1/2019 | Shaashua et al. |
| 10,187,258 B2 | 1/2019 | Nagesh et al. |
| 10,389,742 B2 | 8/2019 | Devi Reddy et al. |
| 10,514,963 B2 | 12/2019 | Shrivastava et al. |
| 10,515,098 B2 | 12/2019 | Park et al. |
| 10,534,326 B2 | 1/2020 | Sridharan et al. |
| 10,536,295 B2 | 1/2020 | Fairweather et al. |
| 10,564,993 B2 | 2/2020 | Deutsch et al. |
| 10,630,706 B2 | 4/2020 | Devi Reddy et al. |
| 10,705,492 B2 | 7/2020 | Harvey |
| 10,708,078 B2 | 7/2020 | Harvey |
| 10,760,815 B2 | 9/2020 | Janakiraman et al. |
| 10,762,475 B2 | 9/2020 | Song et al. |
| 10,798,175 B1 | 10/2020 | Knight et al. |
| 10,824,120 B2 | 11/2020 | Ahmed |
| 10,845,771 B2 | 11/2020 | Harvey |
| 10,854,194 B2 | 12/2020 | Park et al. |
| 10,862,928 B1 | 12/2020 | Badawy et al. |
| 10,921,760 B2 | 2/2021 | Harvey |
| 10,921,972 B2 | 2/2021 | Park et al. |

(56) References Cited

U.S. PATENT DOCUMENTS

| | | |
|---|---|---|
| 10,951,713 B2 | 3/2021 | Knight et al. |
| 10,969,133 B2 | 4/2021 | Harvey |
| 10,986,121 B2 | 4/2021 | Stockdale et al. |
| 11,016,998 B2 | 5/2021 | Park et al. |
| 11,024,292 B2 | 6/2021 | Park et al. |
| 11,038,709 B2 | 6/2021 | Park et al. |
| 11,041,650 B2 | 6/2021 | Li et al. |
| 11,042,144 B2 | 6/2021 | Park et al. |
| 11,054,796 B2 | 7/2021 | Holaso |
| 11,070,390 B2 | 7/2021 | Park et al. |
| 11,073,976 B2 | 7/2021 | Park et al. |
| 11,108,587 B2 | 8/2021 | Park et al. |
| 11,113,295 B2 | 9/2021 | Park et al. |
| 11,119,799 B2 * | 9/2021 | Deutsch .............. G06F 9/45516 |
| 11,216,020 B2 | 1/2022 | Sinha et al. |
| 11,229,138 B1 | 1/2022 | Harvey et al. |
| 11,275,348 B2 | 3/2022 | Park et al. |
| 11,314,726 B2 | 4/2022 | Park et al. |
| 11,314,788 B2 | 4/2022 | Park et al. |
| 11,556,105 B2 | 1/2023 | Cooley et al. |
| 11,561,522 B2 | 1/2023 | Cooley et al. |
| 11,561,523 B2 | 1/2023 | Cooley et al. |
| 11,573,551 B2 | 2/2023 | Cooley et al. |
| 11,586,167 B2 | 2/2023 | Cooley et al. |
| 11,768,004 B2 | 9/2023 | Sinha et al. |
| 2002/0010562 A1 | 1/2002 | Schleiss et al. |
| 2002/0016639 A1 | 2/2002 | Smith et al. |
| 2002/0059229 A1 | 5/2002 | Natsumeda et al. |
| 2002/0123864 A1 | 9/2002 | Eryurek et al. |
| 2002/0147506 A1 | 10/2002 | Eryurek et al. |
| 2002/0177909 A1 | 11/2002 | Fu et al. |
| 2003/0005486 A1 | 1/2003 | Ridolfo et al. |
| 2003/0014130 A1 | 1/2003 | Grumelart |
| 2003/0073432 A1 | 4/2003 | Meade, II |
| 2003/0158704 A1 | 8/2003 | Triginai et al. |
| 2003/0171851 A1 | 9/2003 | Brickfield et al. |
| 2003/0200059 A1 | 10/2003 | Ignatowski et al. |
| 2004/0068390 A1 | 4/2004 | Saunders |
| 2004/0128314 A1 | 7/2004 | Katibah et al. |
| 2004/0133314 A1 | 7/2004 | Ehlers et al. |
| 2004/0199360 A1 | 10/2004 | Friman et al. |
| 2005/0055308 A1 | 3/2005 | Meyer et al. |
| 2005/0108262 A1 | 5/2005 | Fawcett et al. |
| 2005/0154494 A1 | 7/2005 | Ahmed |
| 2005/0278703 A1 | 12/2005 | Lo et al. |
| 2005/0283337 A1 | 12/2005 | Sayal |
| 2005/0289467 A1 | 12/2005 | Imhof et al. |
| 2006/0095521 A1 | 5/2006 | Patinkin |
| 2006/0140207 A1 | 6/2006 | Eschbach et al. |
| 2006/0184479 A1 | 8/2006 | Levine |
| 2006/0200476 A1 | 9/2006 | Gottumukkala et al. |
| 2006/0265751 A1 | 11/2006 | Cosquer et al. |
| 2006/0271589 A1 | 11/2006 | Horowitz et al. |
| 2007/0028179 A1 | 2/2007 | Levin et al. |
| 2007/0203693 A1 | 8/2007 | Estes |
| 2007/0261062 A1 | 11/2007 | Bansal et al. |
| 2007/0273497 A1 | 11/2007 | Kuroda et al. |
| 2007/0273610 A1 | 11/2007 | Baillot |
| 2008/0034425 A1 | 2/2008 | Overcash et al. |
| 2008/0084291 A1 | 4/2008 | Campion et al. |
| 2008/0094230 A1 | 4/2008 | Mock et al. |
| 2008/0097816 A1 | 4/2008 | Freire et al. |
| 2008/0186160 A1 | 8/2008 | Kim et al. |
| 2008/0249756 A1 | 10/2008 | Chaisuparasmikul |
| 2008/0252723 A1 | 10/2008 | Park |
| 2008/0281472 A1 | 11/2008 | Podgorny et al. |
| 2009/0195349 A1 | 8/2009 | Frader-Thompson et al. |
| 2010/0045439 A1 | 2/2010 | Tak et al. |
| 2010/0058248 A1 | 3/2010 | Park |
| 2010/0131533 A1 | 5/2010 | Ortiz |
| 2010/0268720 A1 * | 10/2010 | Spivack .................. G06F 16/81 |
| | | 707/E17.014 |
| 2010/0274366 A1 | 10/2010 | Fata et al. |
| 2010/0281387 A1 | 11/2010 | Holland et al. |
| 2010/0286937 A1 | 11/2010 | Hedley et al. |
| 2010/0324962 A1 | 12/2010 | Nesler et al. |
| 2011/0015802 A1 | 1/2011 | Imes |
| 2011/0047418 A1 | 2/2011 | Drees et al. |
| 2011/0061015 A1 | 3/2011 | Drees et al. |
| 2011/0071685 A1 | 3/2011 | Huneycutt et al. |
| 2011/0077950 A1 | 3/2011 | Hughston |
| 2011/0087650 A1 | 4/2011 | Mackay et al. |
| 2011/0087988 A1 | 4/2011 | Ray et al. |
| 2011/0088000 A1 | 4/2011 | Mackay |
| 2011/0125737 A1 | 5/2011 | Pothering et al. |
| 2011/0137853 A1 | 6/2011 | Mackay |
| 2011/0153603 A1 | 6/2011 | Adiba et al. |
| 2011/0154363 A1 | 6/2011 | Karmarkar |
| 2011/0157357 A1 | 6/2011 | Weisensale et al. |
| 2011/0178977 A1 | 7/2011 | Drees |
| 2011/0191343 A1 | 8/2011 | Heaton et al. |
| 2011/0205022 A1 | 8/2011 | Cavallaro et al. |
| 2011/0218777 A1 | 9/2011 | Chen et al. |
| 2011/0264725 A1 | 10/2011 | Haeberle et al. |
| 2012/0005220 A1 | 1/2012 | Schindlauer et al. |
| 2012/0011126 A1 | 1/2012 | Park et al. |
| 2012/0011141 A1 | 1/2012 | Park et al. |
| 2012/0022698 A1 | 1/2012 | Mackay |
| 2012/0062577 A1 | 3/2012 | Nixon |
| 2012/0064923 A1 | 3/2012 | Imes et al. |
| 2012/0072480 A1 | 3/2012 | Hays et al. |
| 2012/0083930 A1 | 4/2012 | Ilic et al. |
| 2012/0100825 A1 | 4/2012 | Sherman et al. |
| 2012/0101637 A1 | 4/2012 | Imes et al. |
| 2012/0135759 A1 | 5/2012 | Imes et al. |
| 2012/0136485 A1 | 5/2012 | Weber et al. |
| 2012/0158633 A1 | 6/2012 | Eder |
| 2012/0259583 A1 | 10/2012 | Noboa et al. |
| 2012/0272228 A1 | 10/2012 | Marndi et al. |
| 2012/0278051 A1 | 11/2012 | Jiang et al. |
| 2013/0007063 A1 | 1/2013 | Kalra et al. |
| 2013/0038430 A1 | 2/2013 | Blower et al. |
| 2013/0038707 A1 | 2/2013 | Cunningham et al. |
| 2013/0060820 A1 | 3/2013 | Bulusu et al. |
| 2013/0085719 A1 | 4/2013 | Brun et al. |
| 2013/0086497 A1 | 4/2013 | Ambuhl et al. |
| 2013/0097706 A1 | 4/2013 | Titonis et al. |
| 2013/0103221 A1 | 4/2013 | Raman et al. |
| 2013/0167035 A1 | 6/2013 | Imes et al. |
| 2013/0170710 A1 | 7/2013 | Kuoch et al. |
| 2013/0190899 A1 | 7/2013 | Slessman et al. |
| 2013/0204836 A1 | 8/2013 | Choi et al. |
| 2013/0246916 A1 | 9/2013 | Reimann et al. |
| 2013/0247205 A1 | 9/2013 | Schrecker et al. |
| 2013/0254739 A1 | 9/2013 | Chen et al. |
| 2013/0262035 A1 | 10/2013 | Mills |
| 2013/0268128 A1 | 10/2013 | Casilli et al. |
| 2013/0275174 A1 | 10/2013 | Bennett et al. |
| 2013/0275908 A1 | 10/2013 | Reichard |
| 2013/0297050 A1 | 11/2013 | Reichard et al. |
| 2013/0298244 A1 | 11/2013 | Kumar et al. |
| 2013/0331995 A1 | 12/2013 | Rosen |
| 2013/0338970 A1 | 12/2013 | Reghetti |
| 2013/0339018 A1 | 12/2013 | Scheffer et al. |
| 2013/0339292 A1 | 12/2013 | Park et al. |
| 2014/0032506 A1 | 1/2014 | Hoey et al. |
| 2014/0059483 A1 | 2/2014 | Mairs et al. |
| 2014/0081652 A1 | 3/2014 | Klindworth |
| 2014/0100846 A1 | 4/2014 | Haine et al. |
| 2014/0135952 A1 | 5/2014 | Maehara |
| 2014/0152651 A1 | 6/2014 | Chen et al. |
| 2014/0172184 A1 | 6/2014 | Schmidt et al. |
| 2014/0188451 A1 | 7/2014 | Asahara et al. |
| 2014/0189861 A1 | 7/2014 | Gupta et al. |
| 2014/0205155 A1 | 7/2014 | Chung et al. |
| 2014/0207282 A1 | 7/2014 | Angle et al. |
| 2014/0258052 A1 | 9/2014 | Khuti et al. |
| 2014/0269614 A1 | 9/2014 | Maguire et al. |
| 2014/0277765 A1 | 9/2014 | Karimi et al. |
| 2014/0278461 A1 | 9/2014 | Artz |
| 2014/0327555 A1 | 11/2014 | Sager et al. |
| 2015/0019174 A1 | 1/2015 | Kiff et al. |
| 2015/0042240 A1 | 2/2015 | Aggarwal et al. |
| 2015/0058018 A1 | 2/2015 | Georges et al. |

(56) References Cited

U.S. PATENT DOCUMENTS

| | | |
|---|---|---|
| 2015/0105917 A1 | 4/2015 | Sasaki et al. |
| 2015/0112763 A1 | 4/2015 | Goldschneider |
| 2015/0145468 A1 | 5/2015 | Ma et al. |
| 2015/0156031 A1 | 6/2015 | Fadell et al. |
| 2015/0168931 A1 | 6/2015 | Jin |
| 2015/0172300 A1 | 6/2015 | Cochenour |
| 2015/0178421 A1 | 6/2015 | Borrelli et al. |
| 2015/0185261 A1 | 7/2015 | Frader-Thompson et al. |
| 2015/0186777 A1 | 7/2015 | Lecue et al. |
| 2015/0202962 A1 | 7/2015 | Habashima et al. |
| 2015/0204563 A1 | 7/2015 | Imes et al. |
| 2015/0235267 A1 | 8/2015 | Steube et al. |
| 2015/0241895 A1 | 8/2015 | Lu et al. |
| 2015/0244730 A1 | 8/2015 | Vu et al. |
| 2015/0244732 A1 | 8/2015 | Golshan et al. |
| 2015/0261863 A1 | 9/2015 | Dey et al. |
| 2015/0263900 A1 | 9/2015 | Polyakov et al. |
| 2015/0286969 A1 | 10/2015 | Warner et al. |
| 2015/0295796 A1 | 10/2015 | Hsiao et al. |
| 2015/0304193 A1 | 10/2015 | Ishii et al. |
| 2015/0316918 A1 | 11/2015 | Schleiss et al. |
| 2015/0324422 A1 | 11/2015 | Elder |
| 2015/0341212 A1 | 11/2015 | Hsiao et al. |
| 2015/0348417 A1 | 12/2015 | Ignaczak et al. |
| 2015/0356419 A1 | 12/2015 | Shircliff et al. |
| 2015/0379080 A1 | 12/2015 | Jochimski |
| 2016/0011753 A1 | 1/2016 | McFarland et al. |
| 2016/0020946 A1 | 1/2016 | Morper |
| 2016/0033946 A1 | 2/2016 | Zhu et al. |
| 2016/0035246 A1 | 2/2016 | Curtis |
| 2016/0065601 A1 | 3/2016 | Gong et al. |
| 2016/0070736 A1 | 3/2016 | Swan et al. |
| 2016/0078229 A1 | 3/2016 | Gong et al. |
| 2016/0090839 A1 | 3/2016 | Stolarczyk |
| 2016/0109867 A1 | 4/2016 | Wada et al. |
| 2016/0119434 A1 | 4/2016 | Dong et al. |
| 2016/0127712 A1 | 5/2016 | Alfredsson et al. |
| 2016/0132572 A1 | 5/2016 | Chang et al. |
| 2016/0139752 A1 | 5/2016 | Shim et al. |
| 2016/0163186 A1 | 6/2016 | Davidson et al. |
| 2016/0170390 A1 | 6/2016 | Xie et al. |
| 2016/0171862 A1 | 6/2016 | Das et al. |
| 2016/0173816 A1 | 6/2016 | Huenerfauth et al. |
| 2016/0179063 A1 | 6/2016 | De Baynast De Septfontaines et al. |
| 2016/0179315 A1 | 6/2016 | Sarao et al. |
| 2016/0179342 A1 | 6/2016 | Sarao et al. |
| 2016/0179990 A1 | 6/2016 | Sarao et al. |
| 2016/0195856 A1 | 7/2016 | Spero |
| 2016/0203036 A1 | 7/2016 | Mezic et al. |
| 2016/0212165 A1 | 7/2016 | Singla et al. |
| 2016/0239660 A1 | 8/2016 | Azvine et al. |
| 2016/0239756 A1 | 8/2016 | Aggour et al. |
| 2016/0247129 A1* | 8/2016 | Song ................ G06Q 10/20 |
| 2016/0260063 A1 | 9/2016 | Harris et al. |
| 2016/0277374 A1 | 9/2016 | Reid et al. |
| 2016/0313751 A1 | 10/2016 | Risbeck et al. |
| 2016/0313752 A1 | 10/2016 | Przybylski |
| 2016/0313902 A1 | 10/2016 | Hill et al. |
| 2016/0314202 A1 | 10/2016 | Gomadam et al. |
| 2016/0342906 A1 | 11/2016 | Shaashua et al. |
| 2016/0350364 A1 | 12/2016 | Anicic et al. |
| 2016/0357521 A1 | 12/2016 | Zhang et al. |
| 2016/0357828 A1 | 12/2016 | Tobin et al. |
| 2016/0358432 A1 | 12/2016 | Branscomb et al. |
| 2016/0363336 A1 | 12/2016 | Roth et al. |
| 2016/0370258 A1 | 12/2016 | Perez |
| 2016/0378306 A1 | 12/2016 | Kresl et al. |
| 2016/0379326 A1 | 12/2016 | Chan-Gove et al. |
| 2017/0006135 A1 | 1/2017 | Siebel |
| 2017/0011318 A1 | 1/2017 | Vigano et al. |
| 2017/0017221 A1 | 1/2017 | Lamparter et al. |
| 2017/0039255 A1 | 2/2017 | Raj et al. |
| 2017/0052536 A1 | 2/2017 | Warner et al. |
| 2017/0053441 A1 | 2/2017 | Nadumane et al. |
| 2017/0063894 A1 | 3/2017 | Muddu et al. |
| 2017/0068409 A1 | 3/2017 | Nair |
| 2017/0070775 A1 | 3/2017 | Taxier et al. |
| 2017/0075984 A1 | 3/2017 | Deshpande et al. |
| 2017/0084168 A1 | 3/2017 | Janchookiat |
| 2017/0090437 A1 | 3/2017 | Veeramani et al. |
| 2017/0091277 A1 | 3/2017 | Zoch |
| 2017/0093700 A1 | 3/2017 | Gilley et al. |
| 2017/0093915 A1 | 3/2017 | Ellis et al. |
| 2017/0098086 A1 | 4/2017 | Hoernecke et al. |
| 2017/0103327 A1* | 4/2017 | Penilla ................ G06F 3/0482 |
| 2017/0103403 A1 | 4/2017 | Chu et al. |
| 2017/0118236 A1 | 4/2017 | Devi Reddy et al. |
| 2017/0118237 A1 | 4/2017 | Devi Reddy et al. |
| 2017/0118240 A1 | 4/2017 | Devi Reddy et al. |
| 2017/0123389 A1 | 5/2017 | Baez et al. |
| 2017/0134415 A1 | 5/2017 | Muddu et al. |
| 2017/0177715 A1 | 6/2017 | Chang et al. |
| 2017/0180147 A1 | 6/2017 | Brandman et al. |
| 2017/0188216 A1 | 6/2017 | Koskas et al. |
| 2017/0205099 A1 | 7/2017 | Sanghamitra |
| 2017/0212482 A1 | 7/2017 | Boettcher et al. |
| 2017/0212668 A1 | 7/2017 | Shah et al. |
| 2017/0220641 A1 | 8/2017 | Chi et al. |
| 2017/0230930 A1 | 8/2017 | Frey |
| 2017/0235817 A1 | 8/2017 | Deodhar et al. |
| 2017/0251182 A1 | 8/2017 | Siminoff et al. |
| 2017/0270124 A1 | 9/2017 | Nagano et al. |
| 2017/0277769 A1 | 9/2017 | Pasupathy et al. |
| 2017/0278003 A1 | 9/2017 | Liu |
| 2017/0286572 A1* | 10/2017 | Hershey ................ B64F 5/60 |
| 2017/0294132 A1 | 10/2017 | Colmenares |
| 2017/0315522 A1 | 11/2017 | Kwon et al. |
| 2017/0315697 A1 | 11/2017 | Jacobson et al. |
| 2017/0322534 A1 | 11/2017 | Sinha et al. |
| 2017/0323240 A1 | 11/2017 | Johnson et al. |
| 2017/0323389 A1 | 11/2017 | Vavrasek |
| 2017/0329289 A1 | 11/2017 | Kohn et al. |
| 2017/0336770 A1 | 11/2017 | MacMillan |
| 2017/0345287 A1 | 11/2017 | Fuller et al. |
| 2017/0351957 A1 | 12/2017 | Lecue et al. |
| 2017/0357225 A1 | 12/2017 | Asp et al. |
| 2017/0357490 A1 | 12/2017 | Park et al. |
| 2017/0357908 A1 | 12/2017 | Cabadi et al. |
| 2018/0012159 A1 | 1/2018 | Kozloski et al. |
| 2018/0013579 A1 | 1/2018 | Fairweather et al. |
| 2018/0024520 A1 | 1/2018 | Sinha et al. |
| 2018/0039238 A1 | 2/2018 | Gärtner et al. |
| 2018/0048485 A1 | 2/2018 | Pelton et al. |
| 2018/0048693 A1 | 2/2018 | Gulbinas et al. |
| 2018/0069932 A1 | 3/2018 | Tiwari et al. |
| 2018/0108349 A1 | 4/2018 | Hutchings |
| 2018/0113897 A1 | 4/2018 | Donlan et al. |
| 2018/0114140 A1 | 4/2018 | Chen et al. |
| 2018/0119975 A1 | 5/2018 | Park et al. |
| 2018/0137288 A1 | 5/2018 | Polyakov |
| 2018/0146040 A1 | 5/2018 | Pasquali et al. |
| 2018/0157930 A1 | 6/2018 | Rutschman et al. |
| 2018/0162400 A1 | 6/2018 | Abdar |
| 2018/0176241 A1 | 6/2018 | Manadhata et al. |
| 2018/0198627 A1 | 7/2018 | Mullins |
| 2018/0203961 A1 | 7/2018 | Aisu et al. |
| 2018/0232423 A1 | 8/2018 | Park et al. |
| 2018/0239322 A1 | 8/2018 | Matsuo et al. |
| 2018/0239982 A1 | 8/2018 | Rutschman et al. |
| 2018/0275625 A1 | 9/2018 | Park et al. |
| 2018/0276962 A1 | 9/2018 | Butler et al. |
| 2018/0292797 A1 | 10/2018 | Lamparter et al. |
| 2018/0309818 A1 | 10/2018 | Park et al. |
| 2018/0336785 A1 | 11/2018 | Ghannam et al. |
| 2018/0356775 A1 | 12/2018 | Harvey |
| 2018/0359111 A1 | 12/2018 | Harvey |
| 2018/0364654 A1 | 12/2018 | Locke et al. |
| 2019/0003297 A1 | 1/2019 | Brannigan et al. |
| 2019/0005025 A1 | 1/2019 | Malabarba |
| 2019/0013023 A1 | 1/2019 | Pourmohammad et al. |
| 2019/0017719 A1 | 1/2019 | Sinha et al. |
| 2019/0025771 A1 | 1/2019 | Park et al. |
| 2019/0037135 A1 | 1/2019 | Hedge |

(56) References Cited

U.S. PATENT DOCUMENTS

| | | |
|---|---|---|
| 2019/0042988 A1 | 2/2019 | Brown et al. |
| 2019/0088106 A1 | 3/2019 | Grundstrom |
| 2019/0094824 A1 | 3/2019 | Xie et al. |
| 2019/0096217 A1 | 3/2019 | Pourmohammad et al. |
| 2019/0102840 A1 | 4/2019 | Perl et al. |
| 2019/0121801 A1 | 4/2019 | Jethwa et al. |
| 2019/0138512 A1 | 5/2019 | Pourmohammad et al. |
| 2019/0138970 A1 | 5/2019 | Deutsch et al. |
| 2019/0147883 A1 | 5/2019 | Mellenthin et al. |
| 2019/0158309 A1 | 5/2019 | Park et al. |
| 2019/0163152 A1 | 5/2019 | Worrall et al. |
| 2019/0258620 A1 | 8/2019 | Itado et al. |
| 2019/0268178 A1 | 8/2019 | Fairweather et al. |
| 2019/0310979 A1 | 10/2019 | Masuzaki et al. |
| 2019/0361411 A1 | 11/2019 | Park et al. |
| 2019/0361412 A1 | 11/2019 | Park et al. |
| 2019/0377306 A1 | 12/2019 | Harvey |
| 2020/0159173 A1 | 5/2020 | Goyal |
| 2020/0159182 A1 | 5/2020 | Goyal |
| 2020/0159376 A1 | 5/2020 | Goyal |
| 2020/0159723 A1 | 5/2020 | Goyal |
| 2020/0226156 A1 | 7/2020 | Borra et al. |
| 2020/0285203 A1 | 9/2020 | Thakur et al. |
| 2020/0336328 A1 | 10/2020 | Harvey |
| 2020/0348632 A1 | 11/2020 | Harvey |
| 2020/0387576 A1 | 12/2020 | Brett et al. |
| 2020/0396208 A1 | 12/2020 | Brett et al. |
| 2021/0042299 A1 | 2/2021 | Migliori |
| 2021/0043221 A1 | 2/2021 | Yelchuru et al. |
| 2021/0044957 A1 | 2/2021 | Norp et al. |
| 2021/0118067 A1* | 4/2021 | Muenz et al. |
| 2021/0325070 A1 | 10/2021 | Endel et al. |
| 2021/0342961 A1 | 11/2021 | Winter et al. |
| 2021/0381711 A1 | 12/2021 | Harvey et al. |
| 2021/0381712 A1 | 12/2021 | Harvey et al. |
| 2021/0382445 A1 | 12/2021 | Harvey et al. |
| 2021/0383041 A1 | 12/2021 | Harvey et al. |
| 2021/0383042 A1 | 12/2021 | Harvey et al. |
| 2021/0383200 A1 | 12/2021 | Harvey et al. |
| 2021/0383219 A1 | 12/2021 | Harvey et al. |
| 2021/0383235 A1 | 12/2021 | Harvey et al. |
| 2021/0383236 A1 | 12/2021 | Harvey et al. |
| 2022/0066402 A1 | 3/2022 | Harvey et al. |
| 2022/0066405 A1 | 3/2022 | Harvey |
| 2022/0066432 A1 | 3/2022 | Harvey et al. |
| 2022/0066434 A1 | 3/2022 | Harvey et al. |
| 2022/0066528 A1 | 3/2022 | Harvey et al. |
| 2022/0066722 A1 | 3/2022 | Harvey et al. |
| 2022/0066754 A1 | 3/2022 | Harvey et al. |
| 2022/0066761 A1 | 3/2022 | Harvey et al. |
| 2022/0067226 A1 | 3/2022 | Harvey et al. |
| 2022/0067227 A1 | 3/2022 | Harvey et al. |
| 2022/0067230 A1 | 3/2022 | Harvey et al. |
| 2022/0069863 A1 | 3/2022 | Harvey et al. |
| 2022/0070293 A1 | 3/2022 | Harvey et al. |
| 2022/0121965 A1 | 4/2022 | Chatterji et al. |
| 2022/0138684 A1 | 5/2022 | Harvey |
| 2022/0147000 A1 | 5/2022 | Cooley et al. |
| 2022/0150124 A1 | 5/2022 | Cooley et al. |
| 2022/0215264 A1 | 7/2022 | Harvey et al. |
| 2022/0282881 A1 | 9/2022 | Sinha et al. |
| 2023/0010757 A1 | 1/2023 | Preciado |
| 2023/0019745 A1* | 1/2023 | Sawhney .............. G06T 19/006 |
| 2023/0071312 A1 | 3/2023 | Preciado et al. |
| 2023/0076011 A1 | 3/2023 | Preciado et al. |
| 2023/0083703 A1 | 3/2023 | Meiners |
| 2023/0214555 A1 | 7/2023 | Harvey et al. |
| 2023/0252205 A1 | 8/2023 | Harvey et al. |

FOREIGN PATENT DOCUMENTS

| | | |
|---|---|---|
| CN | 101415011 A | 4/2009 |
| CN | 102136099 A | 7/2011 |
| CN | 102136100 A | 7/2011 |
| CN | 102650876 A | 8/2012 |
| CN | 104040583 A | 9/2014 |
| CN | 104603832 A | 5/2015 |
| CN | 104919484 A | 9/2015 |
| CN | 106204392 A | 12/2016 |
| CN | 106406806 A | 2/2017 |
| CN | 106960269 A | 7/2017 |
| CN | 107147639 A1 | 9/2017 |
| CN | 107598928 A | 1/2018 |
| EP | 2 528 033 A1 | 11/2012 |
| EP | 3 268 821 B1 | 1/2018 |
| EP | 3 324 306 A1 | 5/2018 |
| EP | 4 226 263 A1 | 8/2023 |
| JP | H10-049552 A | 2/1998 |
| JP | 2003-162573 A | 6/2003 |
| JP | 2007-018322 A | 1/2007 |
| JP | 4073946 B1 | 4/2008 |
| JP | 2008-107930 A | 5/2008 |
| JP | 2013-152618 A | 8/2013 |
| JP | 2014-044457 A | 3/2014 |
| KR | 2016/0102923 A | 8/2016 |
| WO | WO-2009/020158 A1 | 2/2009 |
| WO | WO-2011/100255 A2 | 8/2011 |
| WO | WO-2013/050333 A1 | 4/2013 |
| WO | WO-2015/106702 A1 | 7/2015 |
| WO | WO-2015/145648 A1 | 10/2015 |
| WO | WO-2017/035536 A1 | 3/2017 |
| WO | WO-2017/192422 A1 | 11/2017 |
| WO | WO-2017/194244 A1 | 11/2017 |
| WO | WO-2017/205330 A1 | 11/2017 |
| WO | WO-2017/213918 A1 | 12/2017 |
| WO | WO-2018/132112 A1 | 7/2018 |
| WO | WO-2020/061621 A1 | 4/2020 |
| WO | WO-2022/042925 A1 | 3/2022 |
| WO | WO-2022/103812 A1 | 5/2022 |
| WO | WO-2022/103813 A1 | 5/2022 |
| WO | WO-2022/103820 A1 | 5/2022 |
| WO | WO-2022/103822 A1 | 5/2022 |
| WO | WO-2022/103824 A1 | 5/2022 |
| WO | WO-2022/103829 A1 | 5/2022 |
| WO | WO-2022/103831 A1 | 5/2022 |

OTHER PUBLICATIONS

Balaji et al, "Brick: Towards a Unified Metadata Schema for Buildings," dated Nov. 16-17, 2016, 10 pages.
Balaji et al, Demo Abstract: Portable Queries Using the Brick Schema for Building Applications, dated Nov. 16-17, 2016, 2 pages.
Bhattacharya et al., Short Paper: Analyzing Metadata Schemas for Buildings—The Good, the Bad and the Ugly, ACM, dated Nov. 4-5, 2015, 4 pages.
Brick: Metadata schema for portable smart building applications, dated Sep. 15, 2018, 3 pages, (Abstract).
Brick: Towards a Unified Metadata Schema For Buildings, dated Nov. 16, 2016, 46 pages.
Building Blocks for Smart Buildings, BrickSchema.org, dated Mar. 2019, 17 pages.
Extended European Search Report issued in EP Application No. 18196948.6 dated Apr. 10, 2019, 9 pages.
Fierro et al., Beyond a House of Sticks: Formalizing Metadata Tags with Brick, dated Nov. 13-14, 2019, 10 pages.
Fierro et al., Dataset: An Open Dataset and Collection Tool for BMS Point Labels, dated Nov. 10, 2019, 3 pages.
Fierro et al., Design and Analysis of a Query Processor for Brick, dated Jan. 2018, 25 pages.
Fierro et al., Design and Analysis of a Query Processor for Brick, dated Nov. 8-9, 2017, 10 pages.
Fierro et al., Mortar: An Open Testbed for Portable Building Analytics, dated Nov. 7-8, 2018, 10 pages.
Fierro et al., Why Brick is a Game Changer for Smart Buildings, URL: https://brickschema.org/papers/Brick_Memoori_Webinar_Presentation.pdf, Memoori Webinar, 2019, 67 pages.
Fierro, Writing Portable Building Analytics with the Brick Metadata Schema, UC Berkeley ACM E-Energy, 2019, 39 pages.
Gao et al., A large-scale evaluation of automated metadata inference approaches on sensors from air handling units, dated May 1, 2018, pp. 14-30.

(56) References Cited

OTHER PUBLICATIONS

International Search Report and Written Opinion for PCT Appl. Ser. No. PCT/US2017/013831 dated Mar. 31, 2017 (14 pages).
International Search Report and Written Opinion for PCT Appl. Ser. No. PCT/US2017/035524 dated Jul. 24, 2017 (14 pages).
International Search Report and Written Opinion on PCT/US2018/052971, dated Mar. 1, 2019, 19 pages.
International Search Report and Written Opinion on PCT/US2018/052974, mailed Dec. 19, 2018, 13 pages.
International Search Report and Written Opinion on PCT/US2018/052994, mailed Jan. 7, 2019, 15 pages.
International Search Report and Written Opinion on PCT/US2019/015481, dated May 17, 2019, 78 pages.
Koh et al., "Scrabble: Transferrable Semi-Automated Semantic Metadata Normalization using Intermediate Representation," dated Nov. 7-8, 2018, 10 pages.
Koh et al., Plaster: An Integration, Benchmark, and Development Framework for Metadata Normalization Methods, dated Nov. 7-8, 2018, 10 pages.
Koh et al., Who can Access What, and When?, dated Nov. 13-14, 2019, 4 pages.
Metadata Schema for Buildings, URL: https://brickschema.org/docs/Brick-Leaflet.pdf, Retrieved from Internet Dec. 24, 2019, 3 pages.
Priyadarshana et al., "Multi-agent Controlled Building Management System," International Conference on Innovation in Power and Advanced Computing Technologies (i-PACT2017), 5 pages, Apr. 21, 2017.
Results of the Partial International Search for PCT/US2018/052971, dated Jan. 3, 2019, 3 pages.
Wei et al., "Development and Implementation of Software Gateways of Fire Fighting Subsystem Running on EBI," Control, Automation and Systems Engineering, IITA International Conference on, IEEE, Jul. 2009, pp. 9-12.
U.S. Appl. No. 17/566,029, Passivelogic, Inc.
U.S. Appl. No. 17/567,275, Passivelogic, Inc.
U.S. Appl. No. 17/722,115, Passivelogic, Inc.
Bhattacharya, A., "Enabling Scalable Smart-Building Analytics," Electrical Engineering and Computer Sciences, University of California at Berkeley, Technical Report No. UCB/EECS-2016-201, Dec. 15, 2016 (121 pages).
Chinese Office Action on CN Appl. No. 201780003995.9 dated Apr. 8, 2021 (21 pages with English language translation).
Chinese Office action on CN Appl. No. 201780043400.2 dated Apr. 25, 2021 (15 pages with English language translation).
Curry, E. et al., "Linking building data in the cloud: Integrating cross-domain building data using linked data." Advanced Engineering Informatics, 2013, 27 (pp. 206-219).
Digital Platform Litigation Documents Part 1, includes cover letter, dismissal of case DDE-1-21-cv-01796, IPR2023-00022 (documents filed Jan. 26, 2023-Oct. 7, 2022), and IPR2023-00085 (documents filed Jan. 26, 2023-Oct. 20, 2022) (748 pages total).
Digital Platform Litigation Documents Part 10, includes DDE-1-21-cv-01796 (documents filed Nov. 1, 2022-Dec. 22, 2021 (1795 pages total).
Digital Platform Litigation Documents Part 2, includes IPR2023-00085 (documents filed Oct. 20, 2022) (172 pages total).
Digital Platform Litigation Documents Part 3, includes IPR2023-00085 (documents filed Oct. 20, 2022) and IPR2023-00170 (documents filed Nov. 28, 2022-Nov. 7, 2022) (397 pages total).
Digital Platform Litigation Documents Part 4, includes IPR2023-00170 (documents filed Nov. 7, 2022) and IPR2023-00217 (documents filed Jan. 18, 2023-Nov. 15, 2022) (434 pages total).
Digital Platform Litigation Documents Part 5, includes IPR2023-00217 (documents filed Nov. 15, 2022) and IPR2023-00257 (documents filed Jan. 25, 2023-Nov. 23, 2022) (316 pages total).
Digital Platform Litigation Documents Part 6, includes IPR2023-00257 (documents filed Nov. 23, 2022) and IPR 2023-00346 (documents filed Jan. 3, 2023-Dec. 13, 2022) (295 pages total).
Digital Platform Litigation Documents Part 7, includes IPR 2023-00346 (documents filed Dec. 13, 2022) and IPR2023-00347 (documents filed Jan. 3, 2023-Dec. 13, 2022) (217 pages total).
Digital Platform Litigation Documents Part 8, includes IPR2023-00347 (documents filed Dec. 13, 2022), EDTX-2-22-cv-00243 (documents filed Sep. 20, 2022-Jun. 29, 2022), and DDE-1-21-cv-01796 (documents filed Feb. 3, 2023-Jan. 10, 2023 (480 pages total).
Digital Platform Litigation Documents Part 9, includes DDE-1-21-cv-01796 (documents filed Jan. 10, 2023-Nov. 1, 2022 (203 pages total).
El Kaed, C. et al., "Building management insights driven by a multi-system semantic representation approach," 2016 IEEE 3rd World Forum on Internet of Things (WF-IoT), Dec. 12-14, 2016, (pp. 520-525).
Ellis, C et al., "Creating a room connectivity graph of a building from per-room sensor units." BuildSys '12, Toronto, ON, Canada, Nov. 6, 2012 (7 pages).
Fierro, G., "Design of an Effective Ontology and Query Processor Enabling Portable Building Applications," Electrical Engineering and Computer Sciences, University of California at Berkeley, Technical Report No. UCB/EECS-2019-106, Jue 27, 2019 (118 pages).
File History for U.S. Appl. No. 12/776,159, filed May 7, 2010 (722 pages).
Final Conference Program, ACM BuildSys 2016, Stanford, CA, USA, Nov. 15-17, 2016 (7 pages).
Harvey, T., "Quantum Part 3: The Tools of Autonomy, How PassiveLogic's Quantum Creator and Autonomy Studio software works," URL: https://www.automatedbuildings.com/news/jan22/articles/passive/211224010000passive.html, Jan. 2022 (7 pages).
Harvey, T., "Quantum: The Digital Twin Standard for Buildings," URL: https://www.automatedbuildings.com/news/feb21/articles/passivelogic/210127124501passivelogic.html, Feb. 2021 (6 pages).
Hu, S. et al., "Building performance optimisation: A hybrid architecture for the integration of contextual information and time-series data," Automation in Construction, 2016, 70 (pp. 51-61).
International Search Report and Written Opinion on PCT/US2017/052060, mailed Oct. 5, 2017, 11 pages.
International Search Report and Written Opinion on PCT/US2017/052633, mailed Oct. 23, 2017, 9 pages.
International Search Report and Written Opinion on PCT/US2017/052829, mailed Nov. 27, 2017, 24 pages.
International Search Report and Written Opinion on PCT/US2018/024068, mailed Jun. 15, 2018, 22 pages.
International Search Report and Written Opinion on PCT/US2018/052975, mailed Jan. 2, 2019, 13 pages.
International Search Report and Written Opinion on PCT/US2020/058381, dated Jan. 27, 2021, 30 pages.
Japanese Office Action on JP Appl. No. 2018-534963 dated May 11, 2021 (16 pages with English language translation).
Li et al., "Event Stream Processing with Out-of-Order Data Arrival," International Conferences on Distributed Computing Systems, 2007, (8 pages).
Nissin Electric Co., Ltd., "Smart power supply system (SPSS)," Outline of the scale verification plan, Nissin Electric Technical Report, Japan, Apr. 23, 2014, vol. 59, No. 1 (23 pages).
Passivelogic, "Explorer: Digital Twin Standard for Autonomous Systems. Made interactive." URL: https://passivelogic.com/software/quantum-explorer/, retrieved from internet Jan. 4, 2023 (13 pages).
Passivelogic, "Quantum: The Digital Twin Standard for Autonomous Systems, A physics-based ontology for next-generation control and AI." URL: https://passivelogic.com/software/quantum-standard/, retrieved from internet Jan. 4, 2023 (20 pages).
Quantum Alliance, "Quantum Explorer Walkthrough," 2022, (7 pages) (screenshots from video).
Sinha, Sudhi and Al Huraimel, Khaled, "Reimagining Businesses with AI" John Wiley & Sons, Inc., Hoboken, NJ, USA, First ed. published 2020 (156 pages).
Sinha, Sudhi R. and Park, Youngchoon, "Building an Effective IoT Ecosystem for Your Business," Johnson Controls International, Springer International Publishing, 2017 (286 pages).

(56) References Cited

OTHER PUBLICATIONS

Sinha, Sudhi, "Making Big Data Work For Your Business: A guide to effective Big Data analytics," Impackt Publishing Ltd., Birmingham, UK, Oct. 2014 (170 pages).
The Virtual Nuclear Tourist, "Calvert Cliffs Nuclear Power Plant," URL: http://www.nucleartourist.com/us/calvert.htm, Jan. 11, 2006 (2 pages).
University of California at Berkeley, Eecs Department, "Enabling Scalable Smart-Building Analytics," URL: https://www2.eecs.berkeley.edu/Pubs/TechRpts/2016/EECS-2016-201.html, retrieved from internet Feb. 15, 2022 (7 pages).
Van Hoof, Bert, "Announcing Azure Digital Twins: Create digital replicas of spaces and infrastructure using cloud, AI and IoT," URL: https://azure.microsoft.com/en-us/blog/announcing-azure-digital-twins-create-digital-replicas-of-spaces-and-infrastructure-using-cloud-ai-and-iot/, Sep. 24, 2018 (11 pages).
W3C, "SPARQL: Query Language for RDF," located on The Wayback Machine, URL: https://web.archive.org/web/20161230061728/http://www.w3.org/TR/rdf-sparql-query/), retrieved from internet Nov. 15, 2022 (89 pages).
White et al., "Reduce building maintenance costs with AWS IoT TwinMaker Knowledge Graph," The Internet of Things on AWS—Official Blog, URL: https://aws.amazon.com/blogs/iot/reduce-building-maintenance-costs-with-aws-iot-twinmaker-knowledge-graph/, Nov. 18, 2022 (10 pages).
Zhou, Q. et al., "Knowledge-infused and Consistent Complex Event Processing over Real-time and Persistent Streams," Further Generation Computer Systems, 2017, 76 (pp. 391-406).
Belsky et al., "A Semantic Enrichment Engine for Building Information Modeling," Computer-Aided Civil and Infrastructure Engineering, 2015 (pp. 1-14).
German Office Action on Appl. No. DE 112018004345.2 dated Feb. 11, 2025 (14 pages with English translation).
Tsigkanos et al., "Adding Static and Dynamic Semantics to Building Information Models," 2016 2nd International Workshop on Software Engineering for Smart Cyber-Physical Systems, Austin, TX, USA, 2016 (pp. 1-7).

\* cited by examiner

WEB SERVICES FOR SMART ENTITY MANAGEMENT FOR SENSOR SYSTEMS

CROSS-REFERENCE TO RELATED APPLICATIONS

This application is a continuation of U.S. patent application Ser. No. 16/143,164 filed Sep. 26, 2018, which claims the benefit of and priority to U.S. Provisional Patent Application No. 62/564,247 filed Sep. 27, 2017, U.S. Provisional Patent Application No. 62/588,179 filed Nov. 17, 2017, U.S. Provisional Patent Application No. 62/588,190 filed Nov. 17, 2017, U.S. Provisional Patent Application No. 62/588,114 filed Nov. 17, 2017, and U.S. Provisional Patent Application No. 62/611,962 filed Dec. 29, 2017. The entire disclosure of each of these patent applications is incorporated by reference herein.

BACKGROUND

One or more aspects of example embodiments of the present disclosure generally relate to creation and maintenance of smart entities. One or more aspects of example embodiments of the present disclosure relate to a system and method for defining relationships between smart entities. One or more aspects of example embodiments of the present disclosure relate to a system and method for correlating data produced by related smart entities.

The Internet of Things (IoT) is a network of interconnected objects (or Things), hereinafter referred to as IoT devices, that produce data through interaction with the environment and/or are controlled over a network. An IoT platform is used by application developers to produce IoT applications for the IoT devices. Generally, IoT platforms are utilized by developers to register and manage the IoT devices, gather and analyze data produced by the IoT devices, and provide recommendations or results based on the collected data. As the number of IoT devices used in various sectors increases, the amount of data being produced and collected has been increasing exponentially. Accordingly, effective analysis of a plethora of collected data is desired.

SUMMARY

One implementation of the present disclosure is an entity management cloud computing system for managing data relating to a plurality of sensors connected to one or more electronic communications networks. The system includes one or more processors and one or more computer-readable storage media communicably coupled to the one or more processors having instructions stored thereon. When executed by the one or more processors, the instructions cause the one or more processors to generate a database of interconnected smart entities. The smart entities include sensor object entities representing each of the plurality of sensors and data entities representing measurements received from the sensors, the smart entities being interconnected by relational objects indicating relationships between the sensor object entities and the data entities. The instructions cause the one or more processors to receive a new measurement from a first sensor of the plurality of sensors, identify a first data entity from a relational object for the first sensor, the first data entity including a plurality of past measurements received from the first sensor, and modify the first data entity within the database of smart entities to include the new measurement received from the first sensor.

In some embodiments, the instructions cause the one or more processors to periodically receive new measurements from the first sensor and update the first data entity each time a new measurement from the first sensor is received.

In some embodiments, the first sensor is configured to send the new measurement to the cloud computing system in response to detecting an event. The instructions may cause the one or more processors to update the first data entity to include a data value representative of the event.

In some embodiments, the new measurement from the first sensor is received in a first protocol or format. The instructions further cause the one or more processors to receive another new measurement from a second sensor of the plurality of sensors. The new measurement from the second sensor is received in a second protocol or format. The instructions further cause the one or more processors to convert the new measurement from the first sensor from the first protocol or format into a third protocol or format and convert the new measurement from the second sensor from the second protocol or format into the third protocol or format.

In some embodiments, each of the sensor object entities includes a static attribute identifying a physical sensor represented by the sensor object entity and a dynamic attribute storing a most recent measurement received from the physical sensor.

In some embodiments, the first data entity includes a static attribute identifying the first sensor and a dynamic attribute storing a most recent measurement received from the first sensor.

In some embodiments, each of the relational objects includes a first attribute identifying one of the sensor object entities and a second attribute identifying one of the data entities.

In some embodiments, modifying the first data entity includes using an attribute of the new measurement received from the first sensor to identify a first sensor object entity associated with the first sensor, identifying a first relational object connecting the first sensor object entity to the first data entity, and storing a value of the new measurement received from the first sensor in the first data entity identified by the first relational object.

In some embodiments, the instructions further cause the one or more processors to create a shadow entity to store the plurality of past measurements received from the first sensor. In some embodiments, the instructions further cause the one or more processors to calculate an average value from the plurality of past measurements stored in the shadow entity. In some embodiments, the instructions further cause the one or more processors to calculate an abnormal value from the plurality of past measurements stored in the shadow entity.

Another implementation of the present disclosure is a method for managing data relating to a plurality of sensors connected to one or more electronic communications networks. The method includes generating a database of interconnected smart entities. The smart entities include sensor object entities representing each of the plurality of sensors and data entities representing measurements received from the sensors, the smart entities being interconnected by relational objects indicating relationships between the sensor object entities and the data entities. The method includes receiving a new measurement from a first sensor of the plurality of sensors, identifying a first data entity from a relational object for the first sensor, the first data entity comprising a plurality of past measurements received from the first sensor, and modifying the first data entity within the database of smart entities to include the new measurement received from the first sensor.

In some embodiments, the method includes periodically receiving new measurements from the first sensor and updating the first data entity each time a new measurement from the first sensor is received.

In some embodiments, the method includes receiving the new measurement from the first sensor in response to the first sensor detecting an event and updating the first data entity to include a data value representative of the event.

In some embodiments, the new measurement from the first sensor is received in a first protocol or format. The method may further include receiving another new measurement from a second sensor of the plurality of sensors. The new measurement from the second sensor may be received in a second protocol or format. The method may include converting the new measurement from the first sensor from the first protocol or format into a third protocol or format and converting the new measurement from the second sensor from the second protocol or format into the third protocol or format.

In some embodiments, each of the sensor object entities includes a static attribute identifying a physical sensor represented by the sensor object entity and a dynamic attribute storing a most recent measurement received from the physical sensor.

In some embodiments, the first data entity includes a static attribute identifying the first sensor and a dynamic attribute storing a most recent measurement received from the first sensor.

In some embodiments, each of the relational objects includes a first attribute identifying one of the sensor object entities and a second attribute identifying one of the data entities.

In some embodiments, modifying the first data entity includes using an attribute of the new measurement received from the first sensor to identify a first sensor object entity associated with the first sensor, identifying a first relational object connecting the first sensor object entity to the first data entity, and storing a value of the new measurement received from the first sensor in the first data entity identified by the first relational object.

In some embodiments, the method includes creating a shadow entity to store the plurality of past measurements received from the first sensor. In some embodiments, the method includes calculating an average value from the plurality of past measurements stored in the shadow entity. In some embodiments, the method includes calculating an abnormal value from the plurality of past measurements stored in the shadow entity.

Another implementation of the present disclosure is one or more non-transitory computer readable media containing program instructions. When executed by one or more processors, the instructions cause the one or more processors to perform operations including generating a database of interconnected smart entities. The smart entities include sensor object entities representing each of the plurality of sensors and data entities representing measurements received from the sensors, the smart entities being interconnected by relational objects indicating relationships between the sensor object entities and the data entities. The operations further include receiving a new measurement from a first sensor of the plurality of sensors, identifying a first data entity from a relational object for the first sensor, the first data entity comprising a plurality of past measurements received from the first sensor, and modifying the first data entity within the database of smart entities to include the new measurement received from the first sensor.

In some embodiments, the instructions further cause the one or more processors to periodically receive new measurements from the first sensor and update the first data entity each time a new measurement from the first sensor is received.

In some embodiments, the instructions further cause the one or more processors to receive the new measurement from the first sensor in response to the first sensor detecting an event and update the first data entity to include a data value representative of the event.

In some embodiments, the new measurement from the first sensor is received in a first protocol or format. The instructions may cause the one or more processors to receive another new measurement from a second sensor of the plurality of sensors. The new measurement from the second sensor may be received in a second protocol or format. The instructions may cause the one or more processors to convert the new measurement from the first sensor from the first protocol or format into a third protocol or format and convert the new measurement from the second sensor from the second protocol or format into the third protocol or format.

In some embodiments, each of the sensor object entities includes a static attribute identifying a physical sensor represented by the sensor object entity and a dynamic attribute storing a most recent measurement received from the physical sensor.

In some embodiments, the first data entity includes a static attribute identifying the first sensor and a dynamic attribute storing a most recent measurement received from the first sensor.

In some embodiments, each of the relational objects includes a first attribute identifying one of the sensor object entities and a second attribute identifying one of the data entities.

In some embodiments, modifying the first data entity includes using an attribute of the measurement received from the first sensor to identify a first sensor object entity associated with the first sensor, identifying a first relational object connecting the first sensor object entity to the first data entity, and storing a value of the measurement received from the first sensor in the first data entity identified by the first relational object.

In some embodiments, the instructions further cause the one or more processors to create a shadow entity to store the plurality of past measurements received from the first sensor. In some embodiments, the instructions further cause the one or more processors to calculate an average value from the plurality of past measurements stored in the shadow entity. In some embodiments, the instructions further cause the one or more processors to calculate an abnormal value from the plurality of past measurements stored in the shadow entity.

Another implementation of the present disclosure is an entity management cloud computing system for managing data relating to a plurality of sensors connected to one or more electronic communications networks. The system includes one or more processors and one or more computer-readable storage media communicably coupled to the one or more processors having instructions stored thereon. When executed by the one or more processors, the instructions cause the one or more processors to generate a database of interconnected smart entities. The smart entities include sensor object entities representing each of the plurality of sensors and data entities representing measurements received from the sensors, the smart entities being interconnected by relational objects indicating relationships between the sensor object entities and the data entities. The instructions cause the one or more processors to receive a new measurement from a first sensor of the plurality of sensors; determine whether the database includes a first sensor object entity representing the first sensor; in response to a determination that the database includes the first sensor object entity, determine whether the database includes a first data entity representing data received from the first sensor; and in response to a determination that the database includes the first data entity, update an attribute of the first data entity to include the new measurement received from the first sensor.

In some embodiments, the instructions cause the one or more processors to periodically receive new measurements from the first sensor and update the first data entity each time a new measurement from the first sensor is received.

In some embodiments, the first sensor is configured to send the new measurement to the cloud computing system in response to detecting an event. The instructions may cause the one or more processors to update the first data entity to include a data value representative of the event.

In some embodiments, the new measurement from the first sensor is received in a first protocol or format. The instructions may cause the one or more processors to receive another new measurement from a second sensor of the plurality of sensors. The new measurement from the second sensor may be received in a second protocol or format. The instructions may cause the one or more processors to convert the new measurement from the first sensor from the first protocol or format into a third protocol or format and convert the new measurement from the second sensor from the second protocol or format into the third protocol or format.

In some embodiments, in response to a determination that the database does not include the first data entity, the instructions further cause the one or more processors to create the first data entity, create a first relational object defining a relationship between the first sensor object entity and the first data entity, and create an attribute of the first data entity and generate a value for the attribute of the first data entity using the new measurement received from the first sensor.

In some embodiments, in response to a determination that the database does not include the first sensor object entity, the instructions further cause the one or more processors to create the first sensor object entity, create the first data entity, create a first relational object defining a relationship between the first sensor object entity and the first data entity, and create an attribute of the first data entity and generate a value for the attribute of the first data entity using the new measurement received from the first sensor.

In some embodiments, determining whether the database includes the first sensor object entity includes reading one or more static attributes of the sensor object entities and determining whether any of the static attributes identify the first sensor.

In some embodiments, determining whether the database includes the first data entity includes reading a relational attribute of the first sensor object entity and determining whether the relational attribute identifies the first data entity.

In some embodiments, determining whether the database includes the first data entity includes identifying a first relational object defining a relationship between the first sensor object entity and one or more of the data entities and determining whether the first relational object identifies the first data entity.

In some embodiments, the first data entity includes a static attribute identifying the first data entity and a dynamic attribute comprising one or more measurements received from the first sensor. Updating the attribute of the first data entity may include updating the dynamic attribute using the new measurement received from the first sensor.

In some embodiments, each of the sensor object entities includes a static attribute identifying a physical sensor represented by the sensor object entity and a dynamic attribute storing a most recent measurement received from the physical sensor.

In some embodiments, the instructions further cause the one or more processors to create a shadow entity to store the plurality of past measurements received from the first sensor. In some embodiments, the instructions further cause the one or more processors to calculate an average value from the plurality of past measurements stored in the shadow entity. In some embodiments, the instructions further cause the one or more processors to calculate an abnormal value from the plurality of past measurements stored in the shadow entity.

Another implementation of the present disclosure is a method for managing data relating to a plurality of sensors connected to one or more electronic communications networks. The method includes generating a database of interconnected smart entities. The smart entities include sensor object entities representing each of the plurality of sensors and data entities representing measurements received from the sensor, the smart entities being interconnected by relational objects indicating relationships between the sensor object entities and the data entities. The method includes receiving a new measurement from a first sensor of the plurality of sensors; determining whether the database includes a first sensor object entity representing the first sensor; in response to a determination that the database includes the first sensor object entity, determining whether the database includes a first data entity representing data received from the first sensor; and in response to a determination that the database includes the first data entity, updating an attribute of the first data entity to include the new measurement received from the first sensor.

In some embodiments, the method includes periodically receiving new measurements from the first sensor and updating the first data entity each time a new measurement from the first sensor is received.

In some embodiments, the method includes receiving the new measurement from the first sensor in response to the first sensor detecting an event and updating the first data entity to include a data value representative of the event.

In some embodiments, the new measurement from the first sensor is received in a first protocol or format. The method may further include receiving another new measurement from a second sensor of the plurality of sensors. The new measurement from the second sensor may be received in a second protocol or format. The method may include converting the new measurement from the first sensor from the first protocol or format into a third protocol or format and converting the new measurement from the second sensor from the second protocol or format into the third protocol or format.

In some embodiments, in response to a determination that the database does not include the first data entity, the method includes creating the first data entity, creating a first relational object defining a relationship between the first sensor object entity and the first data entity, and creating an attribute of the first data entity and generating a value for the attribute of the first data entity using the new measurement received from the first sensor.

In some embodiments, in response to a determination that the database does not include the first sensor object entity, the method includes creating the first sensor object entity, creating the first data entity, creating a first relational object defining a relationship between the first sensor object entity and the first data entity, and creating an attribute of the first data entity and generating a value for the attribute of the first data entity using the new measurement received from the first sensor.

In some embodiments, determining whether the database includes the first sensor object entity includes reading one or more static attributes of the sensor object entities and determining whether any of the static attributes identify the first sensor.

In some embodiments, determining whether the database includes the first data entity includes reading a relational attribute of the first sensor object entity and determining whether the relational attribute identifies the first data entity.

In some embodiments, determining whether the database includes the first data entity includes identifying a first relational object defining a relationship between the first sensor object entity and one or more of the data entities and determining whether the first relational object identifies the first data entity.

In some embodiments, the first data entity includes a static attribute identifying the first data entity and a dynamic attribute comprising one or more measurements received from the first sensor. In some embodiments, updating the attribute of the first data entity includes updating the dynamic attribute using the new measurement received from the first sensor.

In some embodiments, each of the sensor object entities includes a static attribute identifying a physical sensor represented by the sensor object entity and a dynamic attribute storing a most recent measurement received from the physical sensor.

In some embodiments, the method includes creating a shadow entity to store the plurality of past measurements received from the first sensor. In some embodiments, the method includes calculating an average value from the plurality of past measurements stored in the shadow entity. In some embodiments, the method includes calculating an abnormal value from the plurality of past measurements stored in the shadow entity.

Another implementation of the present disclosure is one or more non-transitory computer readable media containing program instructions. When executed by one or more processors, the instructions cause the one or more processors to perform operations including generating a database of interconnected smart entities. The smart entities include sensor object entities representing each of the plurality of sensors and data entities representing measurements received from the sensors, the smart entities being interconnected by relational objects indicating relationships between the sensor object entities and the data entities. The operations include receiving a new measurement from a first sensor of the plurality of sensors; determining whether the database includes a first sensor object entity representing the first sensor; in response to a determination that the database includes the first sensor object entity, determining whether the database includes a first data entity representing measurements received from the first sensor; and in response to a determination that the database includes the first data entity, updating an attribute of the first data entity using the new measurement received from the first sensor.

In some embodiments, the instructions further cause the one or more processors to periodically receive new measurements from the first sensor and update the first data entity each time a new measurement from the first sensor is received.

In some embodiments, the instructions further cause the one or more processors to receive the new measurement from the first sensor in response to the first sensor detecting an event and update the first data entity to include a data value representative of the event.

In some embodiments, the new measurement from the first sensor is received in a first protocol or format. The instructions may cause the one or more processors to receive another new measurement from a second sensor of the plurality of sensors. The new measurement from the second sensor may be received in a second protocol or format. The instructions may cause the one or more processors to convert the new measurement from the first sensor from the first protocol or format into a third protocol or format and convert the new measurement from the second sensor from the second protocol or format into the third protocol or format.

In some embodiments, in response to a determination that the database does not include the first data entity, the instructions further cause the one or more processors to create the first data entity, create a first relational object defining a relationship between the first sensor object entity and the first data entity, and create an attribute of the first data entity and generate a value for the attribute of the first data entity using the new measurement received from the first sensor.

In some embodiments, in response to a determination that the database does not include the first sensor object entity, the instructions further cause the one or more processors to create the first sensor object entity, create the first data entity, create a first relational object defining a relationship between the first sensor object entity and the first data entity, and create an attribute of the first data entity and generate a value for the attribute of the first data entity using the new measurement received from the first sensor.

In some embodiments, determining whether the database includes the first sensor object entity includes reading one or more static attributes of the sensor object entities and determining whether any of the static attributes identify the first sensor.

In some embodiments, determining whether the database includes the first data entity includes reading a relational attribute of the first sensor object entity and determining whether the relational attribute identifies the first data entity.

In some embodiments, determining whether the database includes the first data entity includes identifying a first relational object defining a relationship between the first sensor object entity and one or more of the data entities and determining whether the first relational object identifies the first data entity.

In some embodiments, the first data entity includes a static attribute identifying the first data entity and a dynamic attribute comprising one or more measurements received from the first sensor. Updating the attribute of the first data entity may include updating the dynamic attribute using the new measurement received from the first sensor.

In some embodiments, each of the sensor object entities includes a static attribute identifying a physical sensor represented by the sensor object entity and a dynamic attribute storing a most recent measurement received from the physical sensor.

In some embodiments, the instructions further cause the one or more processors to create a shadow entity to store the plurality of past measurements received from the first sensor. In some embodiments, the instructions further cause the one or more processors to calculate an average value from the plurality of past measurements stored in the shadow entity. In some embodiments, the instructions further cause the one or more processors to calculate an abnormal value from the plurality of past measurements stored in the shadow entity.

BRIEF DESCRIPTION OF THE DRAWINGS

The above and other aspects and features of the present disclosure will become more apparent to those skilled in the art from the following detailed description of the example embodiments with reference to the accompanying drawings, in which.

DETAILED DESCRIPTION

Hereinafter, example embodiments will be described in more detail with reference to the accompanying drawings.

Figure 1:
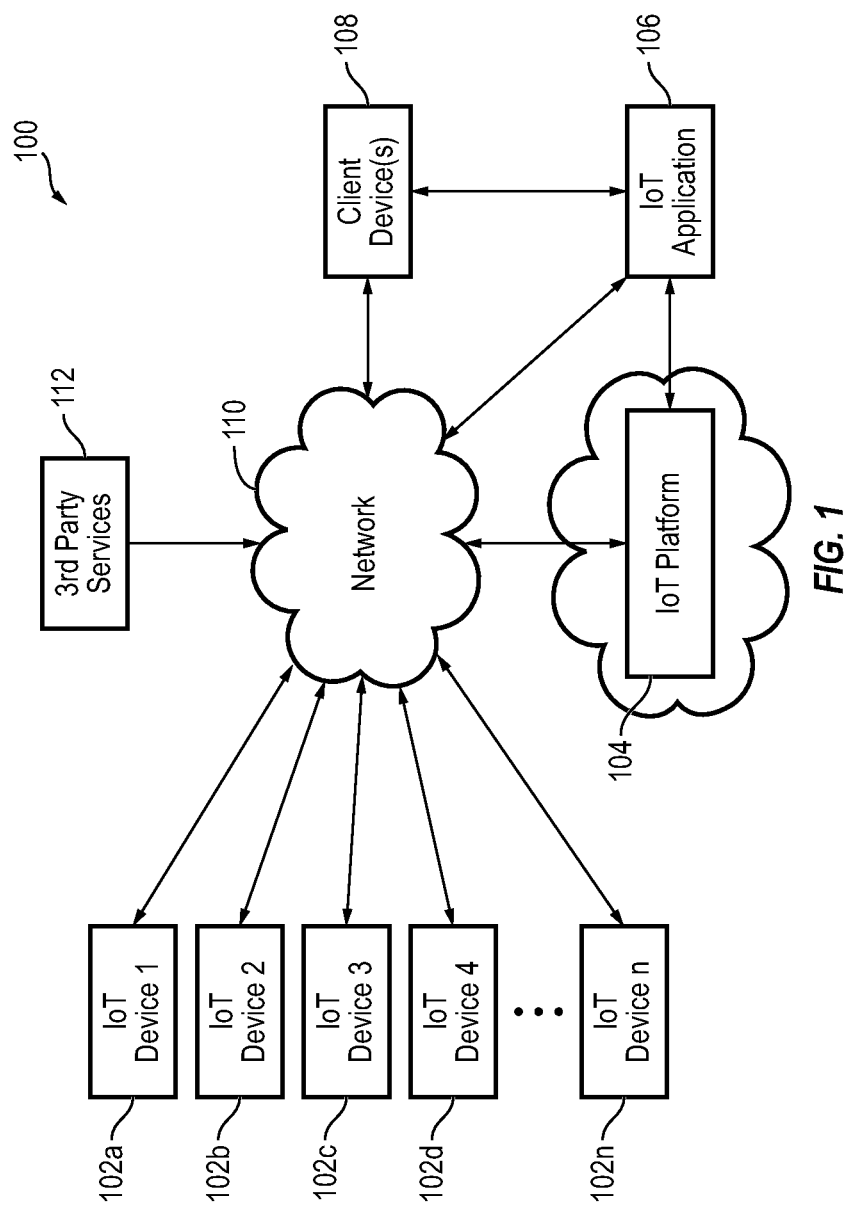
FIG. 1 is a block diagram of an IoT environment according to some embodiments.

FIG. 1 is a block diagram of an IoT environment according to some embodiments. The environment 100 is, in general, a network of connected devices configured to control, monitor, and/or manage equipment, sensors, and other devices in the IoT environment 100. The environment 100 may include, for example, a plurality of IoT devices 102a-102n, a Cloud IoT platform 104, at least one IoT application 106, a client device 108, and any other equipment, applications, and devices that are capable of managing and/or performing various functions, or any combination thereof. Some examples of an IoT environment may include smart homes, smart buildings, smart cities, smart cars, smart medical implants, smart wearables, and the like.

The Cloud IoT platform 104 can be configured to collect data from a variety of different data sources. For example, the Cloud IoT platform 104 can collect data from the IoT devices 102a-102n, the IoT application(s) 106, and the client device(s) 108. For example, IoT devices 102a-102n may include physical devices, sensors, actuators, electronics, vehicles, home appliances, wearables, smart speaker, mobile phones, mobile devices, medical devices and implants, and/or other Things that have network connectivity to enable the IoT devices 102 to communicate with the Cloud IoT platform 104 and/or be controlled over a network (e.g., a WAN, the Internet, a cellular network, and/or the like) 110. Further, the Cloud IoT platform 104 can be configured to collect data from a variety of external systems or services (e.g., 3rd party services) 112. For example, some of the data collected from external systems or services 112 may include weather data from a weather service, news data from a news service, documents and other document-related data from a document service, media (e.g., video, images, audio, social media, etc.) from a media service, and/or the like. While the devices described herein are generally referred to as IoT devices, it should be understood that, in various embodiments, the devices references in the present disclosure could be any type of devices capable of communicating data over an electronic network.

In some embodiments, IoT devices 102a-102n include sensors or sensor systems. For example, IoT devices 102a-102n may include acoustic sensors, sound sensors, vibration sensors, automotive or transportation sensors, chemical sensors, electric current sensors, electric voltage sensors, magnetic sensors, radio sensors, environment sensors, weather sensors, moisture sensors, humidity sensors, flow sensors, fluid velocity sensors, ionizing radiation sensors, subatomic particle sensors, navigation instruments, position sensors, angle sensors, displacement sensors, distance sensors, speed sensors, acceleration sensors, optical sensors, light sensors, imaging devices, photon sensors, pressure sensors, force sensors, density sensors, level sensors, thermal sensors, heat sensors, temperature sensors, proximity sensors, presence sensors, and/or any other type of sensors or sensing systems.

Examples of acoustic, sound, or vibration sensors include geophones, hydrophones, lace sensors, guitar pickups, microphones, and seismometers. Examples of automotive or transportation sensors include air flow meters, air-fuel ratio meters, AFR sensors, blind spot monitors, crankshaft position sensors, defect detectors, engine coolant temperature sensors, Hall effect sensors, knock sensors, map sensors, mass flow sensors, oxygen sensors, parking sensors, radar guns, speedometers, speed sensors, throttle position sensors, tire-pressure monitoring sensors, torque sensors, transmission fluid temperature sensors, turbine speed sensors, variable reluctance sensors, vehicle speed sensors, water sensors, and wheel speed sensors.

Examples of chemical sensors include breathalyzers, carbon dioxide sensors, carbon monoxide detectors, catalytic bead sensors, chemical field-effect transistors, chemiresistors, electrochemical gas sensors, electronic noses, electrolyte-insulator-semiconductor sensors, fluorescent chloride sensors, holographic sensors, hydrocarbon dew point analyzers, hydrogen sensors, hydrogen sulfide sensors, infrared point sensors, ion-selective electrodes, nondispersive infrared sensors, microwave chemistry sensors, nitrogen oxide sensors, olfactometers, optodes, oxygen sensors, ozone monitors, pellistors, pH glass electrodes, potentiometric sensors, redox electrodes, smoke detectors, and zinc oxide nanorod sensors.

Examples of electromagnetic sensors include current sensors, Daly detectors, electroscopes, electron multipliers, Faraday cups, galvanometers, Hall effect sensors, Hall probes, magnetic anomaly detectors, magnetometers, magnetoresistances, mems magnetic field sensors, metal detectors, planar hall sensors, radio direction finders, and voltage detectors.

Examples of environmental sensors include actinometers, air pollution sensors, bedwetting alarms, ceilometers, dew warnings, electrochemical gas sensors, fish counters, frequency domain sensors, gas detectors, hook gauge evaporimeters, humistors, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges.

Examples of flow and fluid velocity sensors include air flow meters, anemometers, flow sensors, gas meter, mass flow sensors, and water meters.

Examples of radiation and particle sensors include cloud chambers, Geiger counters, Geiger-Muller tubes, ionisation chambers, neutron detections, proportional counters, scintillation counters, semiconductor detectors, and thermoluminescent dosimeters. Wexamples of navigation instruments include air speed indicators, altimeters, attitude indicators, depth gauges, fluxgate compasses, gyroscopes, inertial navigation systems, inertial reference nits, magnetic compasses, MHD sensors, ring laser gyroscopes, turn coordinators, tialinx sensors, variometers, vibrating structure gyroscopes, and yaw rate sensors.

Examples of position, angle, displacement, distance, speed, and acceleration sensors include auxanometers, capacitive displacement sensors, capacitive sensing devices, flex sensors, free fall sensors, gravimeters, gyroscopic sensors, impact sensors, inclinometers, integrated circuit piezoelectric sensors, laser rangefinders, laser surface velocimeters, LIDAR sensors, linear encoders, linear variable differential transformers (LVDT), liquid capacitive inclinometers odometers, photoelectric sensors, piezoelectric accelerometers, position sensors, position sensitive devices, angular rate sensors, rotary encoders, rotary variable differential transformers, selsyns, shock detectors, shock data loggers, tilt sensors, tachometers, ultrasonic thickness gauges, variable reluctance sensors, and velocity receivers.

Examples of optical, light, imaging, and photon sensors include charge-coupled devices, CMOS sensors, colorimeters, contact image sensors, electro-optical sensors, flame detectors, infra-red sensors, kinetic inductance detectors, led as light sensors, light-addressable potentiometric sensors, Nichols radiometers, fiber optic sensors, optical position sensors, thermopile laser sensors, photodetectors, photodiodes, photomultiplier tubes, phototransistors, photoelectric sensors, photoionization detectors, photomultipliers, photoresistors, photoswitches, phototubes, scintillometers, Shack-Hartmann sensors, single-photon avalanche diodes, superconducting nanowire single-photon detectors, transition edge sensors, visible light photon counters, and wavefront sensors.

Examples of pressure sensors include barographs, barometers, boost gauges, bourdon gauges, hot filament ionization gauges, ionization gauges, McLeod gauges, oscillating u-tubes, permanent downhole gauges, piezometers, pirani gauges, pressure sensors, pressure gauges, tactile sensors, and time pressure gauges. Examples of force, density, and level sensors include bhangmeters, hydrometers, force gauge and force sensors, level sensors, load cells, magnetic level gauges, nuclear density gauges, piezocapacitive pressure sensors, piezoelectric sensors, strain gauges, torque sensors, and viscometers.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, Doppler radars, motion detectors, occupancy sensors, proximity sensors, passive infrared sensors, reed switches, stud finders, triangulation sensors, touch switches, and wired gloves.

In some embodiments, different sensors send measurements or other data to Cloud IoT platform 104 using a variety of different communications protocols or data formats. Cloud IoT platform 104 can be configured to ingest sensor data received in any protocol or data format and translate the inbound sensor data into a common data format. Cloud IoT platform 104 can create a sensor object smart entity for each sensor that communicates with Cloud IoT platform 104. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, Cloud IoT platform 104 stores sensor data using data entities. Each data entity may correspond to a particular sensor and may include a timeseries of data values received from the corresponding sensor. In some embodiments, Cloud IoT platform 104 stores relational objects that define relationships between sensor object entities and the corresponding data entity. For example, each relational object may identify a particular sensor object entity, a particular data entity, and may define a link between such entities.

In some embodiments, Cloud IoT platform 104 generates data internally. For example, Cloud IoT platform 104 may include a web advertising system, a website traffic monitoring system, a web sales system, and/or other types of platform services that generate data. The data generated by Cloud IoT platform 104 can be collected, stored, and processed along with the data received from other data sources. Cloud IoT platform 104 can collect data directly from external systems or devices or via the network 110. Cloud IoT platform 104 can process and transform collected data to generate timeseries data and entity data.

Client device(s) 108 can include one or more human-machine interfaces or client interfaces (e.g., graphical user interfaces, reporting interfaces, text-based computer interfaces, client-facing web services, web servers that provide pages to web clients, and/or the like) for controlling, viewing, or otherwise interacting with the IoT environment, IoT devices 102, IoT applications 106, and/or the Cloud IoT platform 104. Client device(s) 108 can be a computer workstation, a client terminal, a remote or local interface, or any other type of user interface device. Client device 108 can be a stationary terminal or a mobile device. For example, client device 108 can be a desktop computer, a computer server with a user interface, a laptop computer, a tablet, a smartphone, a PDA, or any other type of mobile or non-mobile device.

IoT applications 106 may be applications running on the client device 108 or any other suitable device that provides an interface for presenting data from the IoT devices 102 and/or the Cloud IoT platform 104 to the client device 108. In some embodiments, the IoT applications 106 may provide an interface for providing commands or controls from the client device 108 to the IoT devices 102 and/or the Cloud IoT platform 104.

IoT Management System

Figure 2:
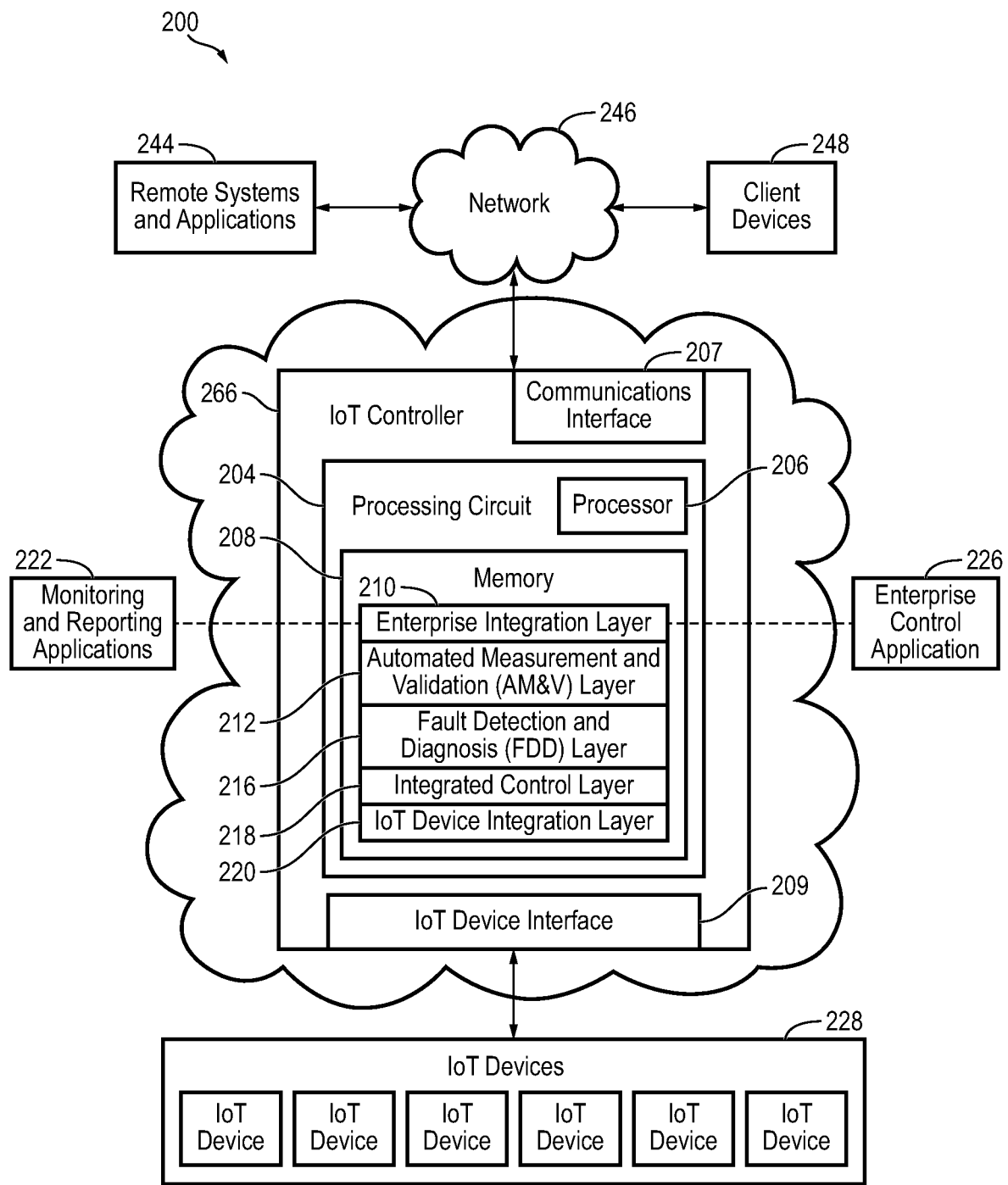
FIG. 2 is a block diagram of an IoT management system, according to some embodiments.

Referring now to FIG. 2, a block diagram of an IoT management system (IoTMS) 200 is shown, according to some embodiments. IoTMS 200 can be implemented in an IoT environment to automatically monitor and control various device functions. IoTMS 200 is shown to include Cloud IoT controller 266 and IoT devices 228. IoT devices 228 are shown to include a plurality of IoT devices. However, the number of IoT devices are not limited to those shown in FIG. 2. Each of the IoT devices 228 may include any suitable device having network connectivity, such as, for example, a mobile phone, laptop, tablet, smart speaker, vehicle, appliance, light fixture, thermostat, wearable, medical implant, equipment, sensor, and/or the like. Further, each of the IoT devices 228 can include any number of devices, controllers, and connections for completing its individual functions and control activities. For example, any of the IoT devices 228 can be a system of devices in itself including controllers, equipment, sensors, and/or the like.

Cloud IoT controller 266 can include one or more computer systems (e.g., servers, supervisory controllers, subsystem controllers, etc.) that serve as system level controllers, application or data servers, head nodes, or master controllers the IoT devices 228 and/or other controllable systems or devices in an IoT environment. Cloud IoT controller 266 may communicate with multiple downstream IoT devices 228 and/or systems via a communications link (e.g., IoT device interface 209) according to like or disparate protocols (e.g., HTTP(s), TCP-IP, HTML, SOAP, REST, LON, BACnet, OPC-UA, ADX, and/or the like).

In some embodiments, the IoT devices 228 receive information from Cloud IoT controller 266 (e.g., commands, setpoints, operating boundaries, etc.) and provides information to Cloud IoT controller 266 (e.g., measurements, valve or actuator positions, operating statuses, diagnostics, etc.). For example, the IoT devices 228 may provide Cloud IoT controller 266 with measurements from various sensors, equipment on/off states, equipment operating capacities, and/or any other information that can be used by Cloud IoT controller 266 to monitor or control a variable state or condition within the IoT environment.

Still referring to FIG. 2, Cloud IoT controller 266 is shown to include a communications interface 207 and an IoT device interface 209. Interface 207 may facilitate communications between Cloud IoT controller 266 and external applications (e.g., monitoring and reporting applications 222, enterprise control applications 226, remote systems and applications 244, applications residing on client devices 248, and the like) for allowing user control, monitoring, and adjustment to Cloud IoT controller 266 and/or IoT devices 228. Interface 207 may also facilitate communications between Cloud IoT controller 266 and client devices 248. IoT device interface 209 may facilitate communications between Cloud IoT controller 266 and IoT devices 228.

Interfaces 207, 209 can be or include wired or wireless communications interfaces (e.g., jacks, antennas, transmitters, receivers, transceivers, wire terminals, etc.) for conducting data communications with IoT devices 228 or other external systems or devices. In various embodiments, communications via interfaces 207, 209 can be direct (e.g., local wired or wireless communications) or via a communications network 246 (e.g., a WAN, the Internet, a cellular network, etc.). For example, interfaces 207, 209 can include an Ethernet card and port for sending and receiving data via an Ethernet-based communications link or network. In another example, interfaces 207, 209 can include a Wi-Fi transceiver for communicating via a wireless communications network. In another example, one or both of interfaces 207, 209 can include cellular or mobile phone communications transceivers. In some embodiments, communications interface 207 is a power line communications interface and IoT device interface 209 is an Ethernet interface. In other embodiments, both communications interface 207 and IoT device interface 209 are Ethernet interfaces or are the same Ethernet interface.

Still referring to FIG. 2, in various embodiments, Cloud IoT controller 266 is implemented using a distributed or cloud computing environment with a plurality of processors and memory. That is, Cloud IoT controller 266 can be distributed across multiple servers or computers (e.g., that can exist in distributed locations). For convenience of description, Cloud IoT controller 266 is shown as including at least one processing circuit 204 including a processor 206 and memory 208. Processing circuit 204 can be communicably connected to IoT device interface 209 and/or communications interface 207 such that processing circuit 204 and the various components thereof can send and receive data via interfaces 207, 209. Processor 206 can be implemented as a general purpose processor, an application specific integrated circuit (ASIC), one or more field programmable gate arrays (FPGAs), a group of processing components, or other suitable electronic processing components.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 208 can be or include volatile memory or non-volatile memory. Memory 208 can include database components, object code components, script components, or any other type of information structure for supporting the various activities and information structures described in the present application. According to some embodiments, memory 208 is communicably connected to processor 206 via processing circuit 204 and includes computer code for executing (e.g., by processing circuit 204 and/or processor 206) one or more processes described herein.

However, the present disclosure is not limited thereto, and in some embodiments, Cloud IoT controller 266 can be implemented within a single computer (e.g., one server, one housing, etc.). Further, while FIG. 2 shows applications 222 and 226 as existing outside of Cloud IoT controller 266, in some embodiments, applications 222 and 226 can be hosted within Cloud IoT controller 266 (e.g., within memory 208).

Still referring to FIG. 2, memory 208 is shown to include an enterprise integration layer 210, an automated measurement and validation (AM&V) layer 212, a fault detection and diagnostics (FDD) layer 216, an integrated control layer 218, and an IoT device integration later 220. Layers 210-220 can be configured to receive inputs from IoT deices 228 and other data sources, determine optimal control actions for the IoT devices 228 based on the inputs, generate control signals based on the optimal control actions, and provide the generated control signals to IoT devices 228.

Enterprise integration layer 210 can be configured to serve clients or local applications with information and services to support a variety of enterprise-level applications. For example, enterprise control applications 226 can be configured to provide subsystem-spanning control to a graphical user interface (GUI) or to any number of enterprise-level business applications (e.g., accounting systems, user identification systems, etc.). Enterprise control applications 226 may also or alternatively be configured to provide configuration GUIs for configuring Cloud IoT controller 266. In yet other embodiments, enterprise control applications 226 can work with layers 210-220 to optimize the IoT environment based on inputs received at interface 207 and/or IoT device interface 209.

IoT device integration layer 220 can be configured to manage communications between Cloud IoT controller 266 and the IoT devices 228. For example, IoT device integration layer 220 may receive sensor data and input signals from the IoT devices 228, and provide output data and control signals to the IoT devices 228. IoT device integration layer 220 may also be configured to manage communications between the IoT devices 228. IoT device integration layer 220 translate communications (e.g., sensor data, input signals, output signals, etc.) across a plurality of multi-vendor/multi-protocol systems.

Integrated control layer 218 can be configured to use the data input or output of IoT device integration layer 220 to make control decisions. Due to the IoT device integration provided by the IoT device integration layer 220, integrated control layer 218 can integrate control activities of the IoT devices 228 such that the IoT devices 228 behave as a single integrated supersystem. In some embodiments, integrated control layer 218 includes control logic that uses inputs and outputs from a plurality of IoT device subsystems to provide insights that separate IoT device subsystems could not provide alone. For example, integrated control layer 218 can be configured to use an input from a first IoT device subsystem to make a control decision for a second IoT device subsystem. Results of these decisions can be communicated back to IoT device integration layer 220.

Automated measurement and validation (AM&V) layer 212 can be configured to verify that control strategies commanded by integrated control layer 218 are working properly (e.g., using data aggregated by AM&V layer 212, integrated control layer 218, IoT device integration layer 220, FDD layer 216, and/or the like). The calculations made by AM&V layer 212 can be based on IoT device data models and/or equipment models for individual IoT devices or subsystems. For example, AM&V layer 212 may compare a model-predicted output with an actual output from IoT devices 228 to determine an accuracy of the model.

Fault detection and diagnostics (FDD) layer 216 can be configured to provide on-going fault detection for the IoT devices 228 and subsystem devices (equipment, sensors, and the like), and control algorithms used by integrated control layer 218. FDD layer 216 may receive data inputs from integrated control layer 218, directly from one or more IoT devices or subsystems, or from another data source. FDD layer 216 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 216 can be configured to output a specific identification of the faulty component or cause of the fault (e.g., faulty IoT device or sensor) using detailed subsystem inputs available at IoT device integration layer 220. In other exemplary embodiments, FDD layer 216 is configured to provide "fault" events to integrated control layer 218 which executes control strategies and policies in response to the received fault events. According to some embodiments, FDD layer 216 (or a policy executed by an integrated control engine or business rules engine) may shut-down IoT systems, devices, and/or or components or direct control activities around faulty IoT systems, devices, and/or components to reduce waste, extend IoT device life, or to assure proper control response.

FDD layer 216 can be configured to store or access a variety of different system data stores (or data points for live data). FDD layer 216 may use some content of the data stores to identify faults at the IoT device or equipment level and other content to identify faults at component or subsystem levels. For example, the IoT devices 228 may generate temporal (i.e., time-series) data indicating the performance of IoTMS 200 and the various components thereof. The data generated by the IoT devices 228 can include measured or calculated values that exhibit statistical characteristics and provide information about how the corresponding system or IoT application process is performing in terms of error from its setpoint. These processes can be examined by FDD layer 216 to expose when the system begins to degrade in performance and alert a user to repair the fault before it becomes more severe.

IoT Management System with Cloud IoT Platform Services

Figure 3:
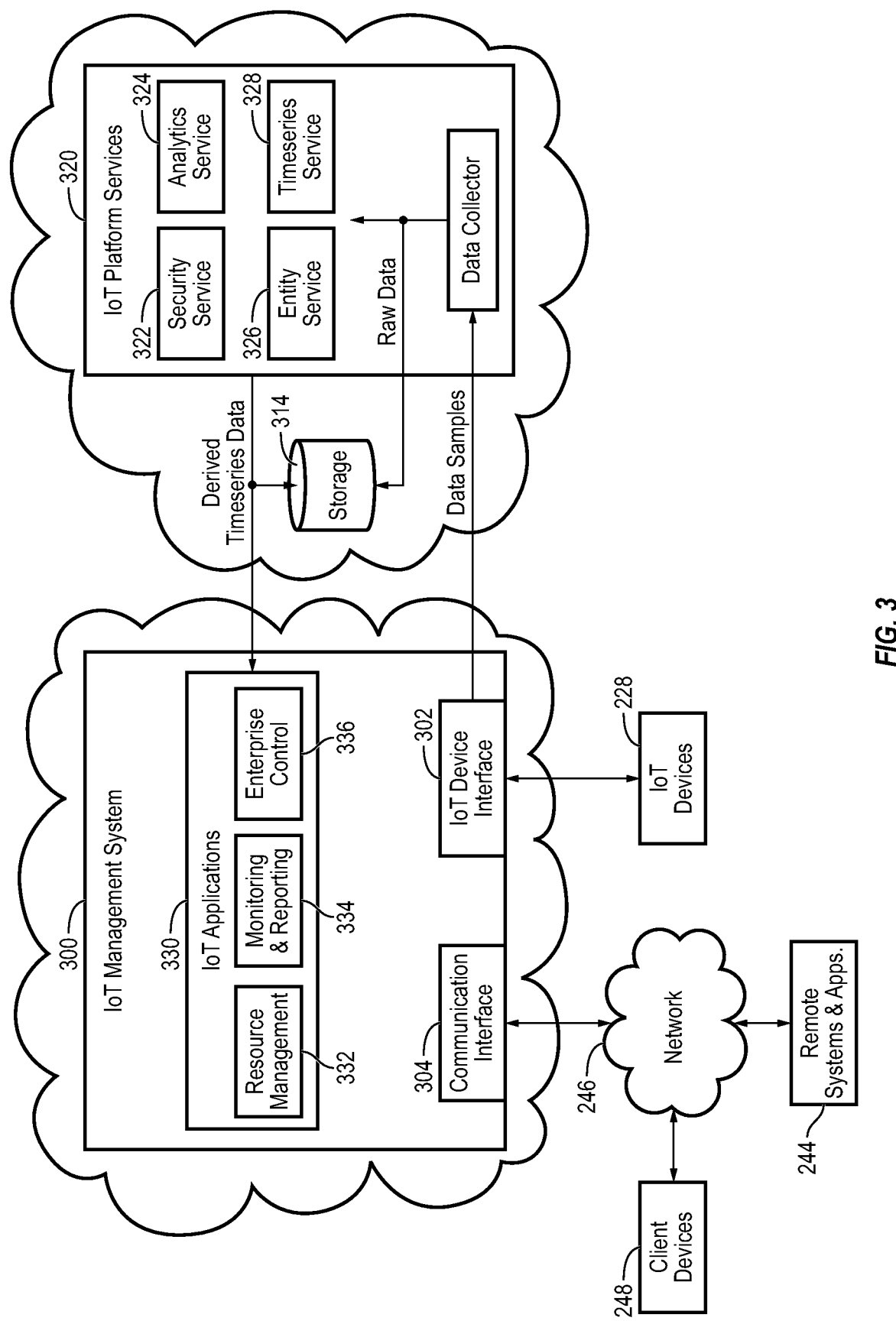
FIG. 3 is a block diagram of another IoT management system, according to some embodiments.

Referring now to FIG. 3, a block diagram of another IoT management system (IoTMS) 300 is shown, according to some embodiments. IoTMS 300 can be configured to collect data samples (e.g., raw data) from IoT devices 228 and provide the data samples to Cloud IoT platform services 320 to generate raw timeseries data, derived timeseries data, and/or entity data from the data samples. Cloud IoT platform services 320 can process and transform the raw timeseries data to generate derived timeseries data. Throughout this disclosure, the term "derived timeseries data" is used to describe the result or output of a transformation or other timeseries processing operation performed by Cloud IoT platform services 320 (e.g., data aggregation, data cleansing, virtual point calculation, etc.). The term "entity data" is used to describe the attributes of various smart entities (e.g., IoT systems, devices, components, sensors, and the like) and the relationships between the smart entities. The derived timeseries data can be provided to various applications 330 of IoTMS 300 and/or stored in storage 314 (e.g., as materialized views of the raw timeseries data). In some embodiments, Cloud IoT platform services 320 separates data collection; data storage, retrieval, and analysis; and data visualization into three different layers. This allows Cloud IoT platform services 320 to support a variety of applications 330 that use the derived timeseries data and/or entity data, and allows new applications 330 to reuse the existing infrastructure provided by Cloud IoT platform services 320.

It should be noted that the components of IoTMS 300 and/or Cloud IoT platform services 320 can be integrated within a single device (e.g., a supervisory controller, a IoT device controller, etc.) or distributed across multiple separate systems or devices. In other embodiments, some or all of the components of IoTMS 300 and or Cloud IoT platform services 320 can be implemented as part of a cloud-based computing system configured to receive and process data from one or more IoT systems, devices, and/or components. In other embodiments, some or all of the components of IoTMS 300 and/or Cloud IoT platform services 320 can be components of a subsystem level controller, a subplant controller, a device controller, a field controller, a computer workstation, a client device, or any other system or device that receives and processes data from IoT devices.

IoTMS 300 can include many of the same components as IoTMS 200, as described with reference to FIG. 2. For example, IoTMS 300 is shown to include an IoT device interface 302 and a communications interface 304. Interfaces 302-304 can include wired or wireless communications interfaces (e.g., jacks, antennas, transmitters, receivers, transceivers, wire terminals, etc.) for conducting data communications with IoT devices 228 or other external systems or devices. Communications conducted via interfaces 302-304 can be direct (e.g., local wired or wireless communications) or via a communications network 246 (e.g., a WAN, the Internet, a cellular network, etc.).

Communications interface 304 can facilitate communications between IoTMS 300 and external applications (e.g., remote systems and applications 244) for allowing user control, monitoring, and adjustment to IoTMS 300. Communications interface 304 can also facilitate communications between IoTMS 300 and client devices 248. IoT device interface 302 can facilitate communications between IoTMS 300, Cloud IoT platform services 320, and IoT devices 228. IoTMS 300 can be configured to communicate with IoT devices 228 and/or Cloud IoT platform services 320 using any suitable protocols (e.g., HTTP(s), TCP-IP, HTML, SOAP, REST, LON, BACnet, OPC-UA, ADX, and/or the like). In some embodiments, IoTMS 300 receives data samples from IoT devices 228 and provides control signals to IoT devices 228 via IoT device interface 302.

IoT devices 228 may include any suitable device having network connectivity, such as, for example, a mobile phone, laptop, tablet, smart speaker, vehicle, appliance, light fixture, thermostat, wearable, medical implant, equipment, sensor, and/or the like. Further, each of the IoT devices 228 can include any number of devices, controllers, and connections for completing its individual functions and control activities. For example, any of the IoT devices 228 can be a system of devices in itself including controllers, equipment, sensors, and/or the like.

Still referring to FIG. 3, each of IoTMS 300 and Cloud IoT platform services 320 includes a processing circuit including a processor and memory. Each of the processors can be a general purpose or specific purpose processor, an application specific integrated circuit (ASIC), one or more field programmable gate arrays (FPGAs), a group of processing components, or other suitable processing components. Each of the processors is configured to execute computer code or instructions stored in memory or received from other computer readable media (e.g., CDROM, network storage, a remote server, etc.).

The memory can include one or more devices (e.g., memory units, memory devices, storage devices, etc.) for storing data and/or computer code for completing and/or facilitating the various processes described in the present disclosure. Memory can include random access memory (RAM), read-only memory (ROM), hard drive storage, temporary storage, non-volatile memory, flash memory, optical memory, or any other suitable memory for storing software objects and/or computer instructions. Memory can include database components, object code components, script components, or any other type of information structure for supporting the various activities and information structures described in the present disclosure. Memory can be communicably connected to the processor via the processing circuit and can include computer code for executing (e.g., by the processor) one or more processes described herein.

Still referring to FIG. 3, Cloud IoT platform services 320 is shown to include a data collector 312. Data collector 312 is shown receiving data samples from the IoT devices 228 via the IoT device interface 302. However, the present disclosure is not limited thereto, and the data collector 312 may receive the data samples directly from the IoT devices 228 (e.g., via network 246 or via any suitable method). In some embodiments, the data samples include data values for various data points. The data values can be measured or calculated values, depending on the type of data point. For example, a data point received from a sensor can include a measured data value indicating a measurement by the sensor. A data point received from a controller can include a calculated data value indicating a calculated efficiency of the controller. Data collector 312 can receive data samples from multiple different devices (e.g., IoT systems, devices, components, sensors, and the like) of the IoT devices 228.

The data samples can include one or more attributes that describe or characterize the corresponding data points. For example, the data samples can include a name attribute defining a point name or ID (e.g., "B1F4R2.T-Z"), a device attribute indicating a type of device from which the data samples are received, a unit attribute defining a unit of measure associated with the data value (e.g., ° F., ° C., kPA, etc.), and/or any other attribute that describes the corresponding data point or provides contextual information regarding the data point. The types of attributes included in each data point can depend on the communications protocol used to send the data samples to Cloud IoT platform services 320. For example, data samples received via the ADX protocol or BACnet protocol can include a variety of descriptive attributes along with the data value, whereas data samples received via the Modbus protocol may include a lesser number of attributes (e.g., only the data value without any corresponding attributes).

In some embodiments, each data sample is received with a timestamp indicating a time at which the corresponding data value was measured or calculated. In other embodiments, data collector 312 adds timestamps to the data samples based on the times at which the data samples are received. Data collector 312 can generate raw timeseries data for each of the data points for which data samples are received. Each timeseries can include a series of data values for the same data point and a timestamp for each of the data values. For example, a timeseries for a data point provided by a temperature sensor can include a series of temperature values measured by the temperature sensor and the corresponding times at which the temperature values were measured. An example of a timeseries which can be generated by data collector 312 is as follows:
[<key,timestamp$_1$, value$_1$>, <key,timestamp$_2$,value$_2$>, <key, timestamp$_3$,value$_3$>] where key is an identifier of the source of the raw data samples (e.g., timeseries ID, sensor ID, etc.), timestamp$_i$ identifies the time at which the ith sample was collected, and value$_i$ indicates the value of the ith sample. Data collector 312 can add timestamps to the data samples or modify existing timestamps such that each data sample includes a local timestamp. Each local timestamp indicates the local time at which the corresponding data sample was measured or collected and can include an offset relative to universal time. The local timestamp indicates the local time at the location the data point was measured at the time of measurement. The offset indicates the difference between the local time and a universal time (e.g., the time at the international date line). For example, a data sample collected in a time zone that is six hours behind universal time can include a local timestamp (e.g., Timestamp=2016-03-18T14:10:02) and an offset indicating that the local timestamp is six hours behind universal time (e.g., Offset=−6:00). The offset can be adjusted (e.g., +1:00 or −1:00) depending on whether the time zone is in daylight savings time when the data sample is measured or collected.

The combination of the local timestamp and the offset provides a unique timestamp across daylight saving time boundaries. This allows an application using the timeseries data to display the timeseries data in local time without first converting from universal time. The combination of the local timestamp and the offset also provides enough information to convert the local timestamp to universal time without needing to look up a schedule of when daylight savings time occurs. For example, the offset can be subtracted from the local timestamp to generate a universal time value that corresponds to the local timestamp without referencing an external database and without requiring any other information.

In some embodiments, data collector 312 organizes the raw timeseries data. Data collector 312 can identify a system or device associated with each of the data points. For example, data collector 312 can associate a data point with an IoT device, system, component, sensor, or any other type of system or device. In some embodiments, a data point entity may be created for the data point, in which case, the data collector 312 can associate the data point with the data point entity. In various embodiments, data collector uses the name of the data point, a range of values of the data point, statistical characteristics of the data point, or other attributes of the data point to identify a particular system, device, or data point entity associated with the data point. Data collector 312 can then determine how that system or device relates to the other systems or devices in the IoT environment from entity data. For example, data collector 312 can determine that the identified system or device is part of a larger system or serves a particular function within the larger system from the entity data. In some embodiments, data collector 312 uses or retrieves an entity graph (e.g., via the entity service 326) based on the entity data when organizing the timeseries data.

Data collector 312 can provide the raw timeseries data to the other Cloud IoT platform services 320 and/or store the raw timeseries data in storage 314. Storage 314 may be internal storage or external storage. For example, storage 314 can be internal storage with relation to Cloud IoT platform service 320 and/or IoTMS 300, and/or may include a remote database, cloud-based data hosting, or other remote data storage. Storage 314 can be configured to store the raw timeseries data obtained by data collector 312, the derived timeseries data generated by Cloud IoT platform services 320, and/or directed acyclic graphs (DAGs) used by Cloud IoT platform services 320 to process the timeseries data.

Still referring to FIG. 3, Cloud IoT platform services 320 can receive the raw timeseries data from data collector 312 and/or retrieve the raw timeseries data from storage 314. Cloud IoT platform services 320 can include a variety of services configured to analyze, process, and transform the raw timeseries data. For example, Cloud IoT platform services 320 is shown to include a security service 322, an analytics service 324, an entity service 326, and a timeseries service 328. Security service 322 can assign security attributes to the raw timeseries data to ensure that the timeseries data are only accessible to authorized individuals, systems, or applications. Security service 322 may include a messaging layer to exchange secure messages with the entity service 326. In some embodiment, security service 322 may provide permission data to entity service 326 so that entity service 326 can determine the types of entity data that can be accessed by a particular entity or device. Entity service 324 can assign entity information (or entity data) to the timeseries data to associate data points with a particular system, device, or component. Timeseries service 328 and analytics service 324 can apply various transformations, operations, or other functions to the raw timeseries data to generate derived timeseries data.

In some embodiments, timeseries service 328 aggregates predefined intervals of the raw timeseries data (e.g., quarter-hourly intervals, hourly intervals, daily intervals, monthly intervals, etc.) to generate new derived timeseries of the aggregated values. These derived timeseries can be referred to as "data rollups" since they are condensed versions of the raw timeseries data. The data rollups generated by timeseries service 328 provide an efficient mechanism for IoT applications 330 to query the timeseries data. For example, IoT applications 330 can construct visualizations of the timeseries data (e.g., charts, graphs, etc.) using the pre-aggregated data rollups instead of the raw timeseries data. This allows IoT applications 330 to simply retrieve and present the pre-aggregated data rollups without requiring IoT applications 330 to perform an aggregation in response to the query. Since the data rollups are pre-aggregated, IoT applications 330 can present the data rollups quickly and efficiently without requiring additional processing at query time to generate aggregated timeseries values.

In some embodiments, timeseries service 328 calculates virtual points based on the raw timeseries data and/or the derived timeseries data. Virtual points can be calculated by applying any of a variety of mathematical operations (e.g., addition, subtraction, multiplication, division, etc.) or functions (e.g., average value, maximum value, minimum value, thermodynamic functions, linear functions, nonlinear functions, etc.) to the actual data points represented by the timeseries data. For example, timeseries service 328 can calculate a virtual data point (pointID$_3$) by adding two or more actual data points (pointID$_1$ and pointID$_2$) (e.g., pointID$_3$=point$_1$+pointID$_2$). As another example, timeseries service 328 can calculate an enthalpy data point (pointID$_4$) based on a measured temperature data point (pointID$_5$) and a measured pressure data point (pointID$_6$) (e.g., pointID$_4$=enthalpy(pointID$_5$, pointID$_6$)). The virtual data points can be stored as derived timeseries data.

IoT applications 330 can access and use the virtual data points in the same manner as the actual data points. IoT applications 330 do not need to know whether a data point is an actual data point or a virtual data point since both types of data points can be stored as derived timeseries data and can be handled in the same manner by IoT applications 330. In some embodiments, the derived timeseries are stored with attributes designating each data point as either a virtual data point or an actual data point. Such attributes allow IoT applications 330 to identify whether a given timeseries represents a virtual data point or an actual data point, even though both types of data points can be handled in the same manner by IoT applications 330.

In some embodiments, analytics service 324 analyzes the raw timeseries data and/or the derived timeseries data with the entity data to detect faults. Analytics service 324 can apply a set of fault detection rules based on the entity data to the timeseries data to determine whether a fault is detected at each interval of the timeseries. Fault detections can be stored as derived timeseries data. For example, analytics service 324 can generate a new fault detection timeseries with data values that indicate whether a fault was detected at each interval of the timeseries. The fault detection timeseries can be stored as derived timeseries data along with the raw timeseries data in storage 314.

Still referring to FIG. 3, IoTMS 300 is shown to include several IoT applications 330 including a resource management application 332, monitoring and reporting applications 334, and enterprise control applications 336. Although only a few IoT applications 330 are shown, it is contemplated that IoT applications 330 can include any of a variety of applications configured to use the derived timeseries generated by Cloud IoT platform services 320. In some embodiments, IoT applications 330 exist as a separate layer of IoTMS 300 (e.g., a part of Cloud IoT platform services 320 and/or data collector 312). In other embodiments, IoT applications 330 can exist as remote applications that run on remote systems or devices (e.g., remote systems and applications 244, client devices 248, and/or the like).

IoT applications 330 can use the derived timeseries data and entity data to perform a variety data visualization, monitoring, and/or control activities. For example, resource management application 332 and monitoring and reporting application 334 can use the derived timeseries data and entity data to generate user interfaces (e.g., charts, graphs, etc.) that present the derived timeseries data and/or entity data to a user. In some embodiments, the user interfaces present the raw timeseries data and the derived data rollups in a single chart or graph. For example, a dropdown selector can be provided to allow a user to select the raw timeseries data or any of the data rollups for a given data point.

Enterprise control application 336 can use the derived timeseries data and/or entity data to perform various control activities. For example, enterprise control application 336 can use the derived timeseries data and/or entity data as input to a control algorithm (e.g., a state-based algorithm, an extremum seeking control (ESC) algorithm, a proportional-integral (PI) control algorithm, a proportional-integral-derivative (PID) control algorithm, a model predictive control (MPC) algorithm, a feedback control algorithm, etc.) to generate control signals for IoT devices 228. In some embodiments, IoT devices 228 use the control signals to operate other systems, devices, components, and/or sensors, which can affect the measured or calculated values of the data samples provided to IoTMS 300 and/or Cloud IoT platform services 320. Accordingly, enterprise control application 336 can use the derived timeseries data and/or entity data as feedback to control the systems and devices of the IoT devices 228.

Cloud Entity IoT Platform Service

Figure 4:
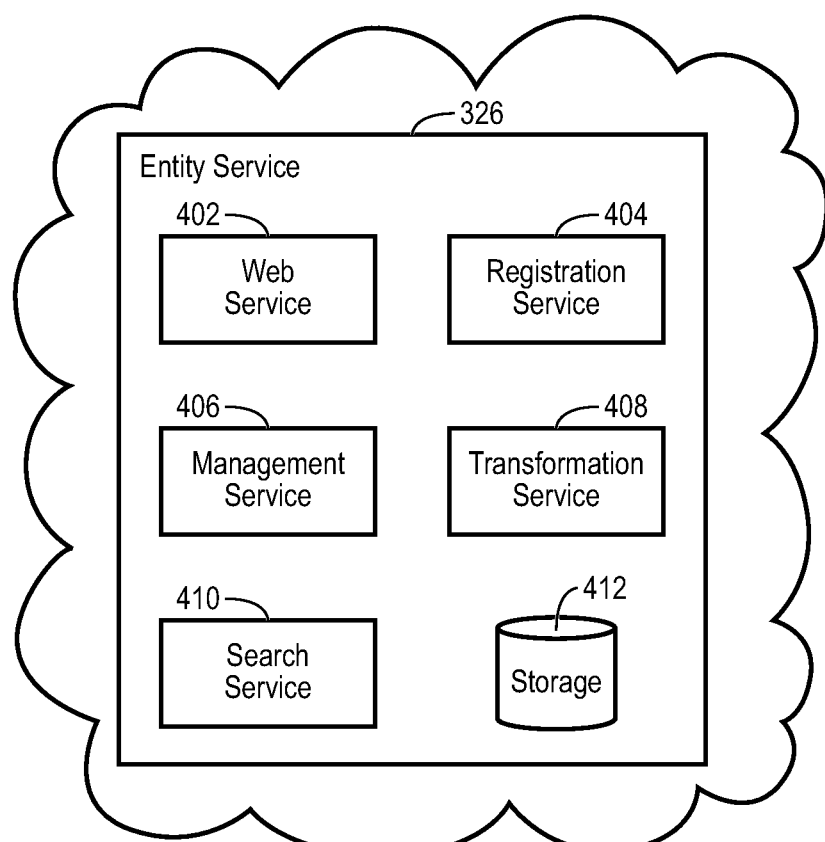
FIG. 4 is a block diagram illustrating a Cloud entity service of FIG. 3 in greater detail, according to some embodiments.

Referring now to FIG. 4, a block diagram illustrating entity service 326 in greater detail is shown, according to some embodiments. Entity service 326 registers and manages various devices and entities in the Cloud IoT platform services 320. According to various embodiments, an entity may be any person, place, or physical object, hereafter referred to as an object entity. Further, an entity may be any event, data point, or record structure, hereinafter referred to as data entity. In addition, relationships between entities may be defined by relational objects.

In some embodiments, an object entity may be defined as having at least three types of attributes. For example, an object entity may have a static attribute, a dynamic attribute, and a behavioral attribute. The static attribute may include any unique identifier of the object entity or characteristic of the object entity that either does not change over time or changes infrequently (e.g., a device ID, a person's name or social security number, a place's address or room number, and the like). The dynamic attribute may include a property of the object entity that changes over time (e.g., location, age, measurement, data point, and the like). In some embodiments, the dynamic attribute of an object entity may be linked to a data entity. In this case, the dynamic attribute of the object entity may simply refer to a location (e.g., data/network address) or static attribute (e.g., identifier) of the linked data entity, which may store the data (e.g., the value or information) of the dynamic attribute. Accordingly, in some such embodiments, when a new data point is received for the object entity, only the linked data entity may be updated, while the object entity remains unchanged. Therefore, resources that would have been expended to update the object entity may be reduced.

However, the present disclosure is not limited thereto. For example, in some embodiments, there may also be some data that is updated (e.g., during predetermined intervals) in the dynamic attribute of the object entity itself. For example, the linked data entity may be configured to be updated each time a new data point is received, whereas the corresponding dynamic attribute of the object entity may be configured to be updated less often (e.g., at predetermined intervals less than the intervals during which the new data points are received). In some implementations, the dynamic attribute of the object entity may include both a link to the data entity and either a portion of the data from the data entity or data derived from the data of the data entity. For example, in an embodiment in which periodic odometer readings are received from a connected car, an object entity corresponding to the car could include the last odometer reading and a link to a data entity that stores a series of the last ten odometer readings received from the car.

The behavioral attribute may define a function of the object entity, for example, based on inputs, capabilities, and/or permissions. For example, behavioral attributes may define the types of inputs that the object entity is configured to accept, how the object entity is expected to respond under certain conditions, the types of functions that the object entity is capable of performing, and the like. As a non-limiting example, if the object entity represents a person, the behavioral attribute of the person may be his/her job title or job duties, user permissions to access certain systems, expected location or behavior given a time of day, tendencies or preferences based on connected activity data received by entity service 326 (e.g., social media activity), and the like. As another non-limiting example, if the object entity represents a device, the behavioral attributes may include the types of inputs that the device can receive, the types of outputs that the device can generate, the types of controls that the device is capable of, the types of software or versions that the device currently has, known responses of the device to certain types of input (e.g., behavior of the device defined by its programming), and the like.

In some embodiments, the data entity may be defined as having at least a static attribute and a dynamic attribute. The static attribute of the data entity may include a unique identifier or description of the data entity. For example, if the data entity is linked to a dynamic attribute of an object entity, the static attribute of the data entity may include an identifier that is used to link to the dynamic attribute of the object entity. In some embodiments, the dynamic attribute of the data entity represents the data for the dynamic attribute of the linked object entity. In some embodiments, the dynamic attribute of the data entity may represent some other data that is analyzed, inferred, calculated, or determined based on data from a plurality of data sources.

In some embodiments, the relational object may be defined as having at least a static attribute. The static attribute of the relational object may semantically define the type of relationship between two or more entities. For example, in a non-limiting embodiment, a relational object for a relationship that semantically defines that Entity A has a part of Entity B, or that Entity B is a part of Entity A may include:

hasPart{Entity A, Entity B} where the static attribute hasPart defines what the relationship is of the listed entities, and the order of the listed entities or data field of the relational object specifies which entity is the part of the other (e.g., Entity A→hasPart→Entity B).

In various embodiments, the relational object is an object-oriented construct with predefined fields that define the relationship between two or more entities, regardless of the type of entities. For example, Cloud IoT platform service 320 can provide a rich set of pre-built entity models with standardized relational objects that can be used to describe how any two or more entities are semantically related, as well as how data is exchanged and/or processed between the entities. Accordingly, a global change to a definition or relationship of a relational object at the system level can be effected at the object level, without having to manually change the entity relationships for each object or entity individually. Further, in some embodiments, a global change at the system level can be propagated through to third-party applications integrated with Cloud IoT platform services 320 such that the global change can be implemented across all of the third-party applications without requiring manual implementation of the change in each disparate application.

Figure 5:
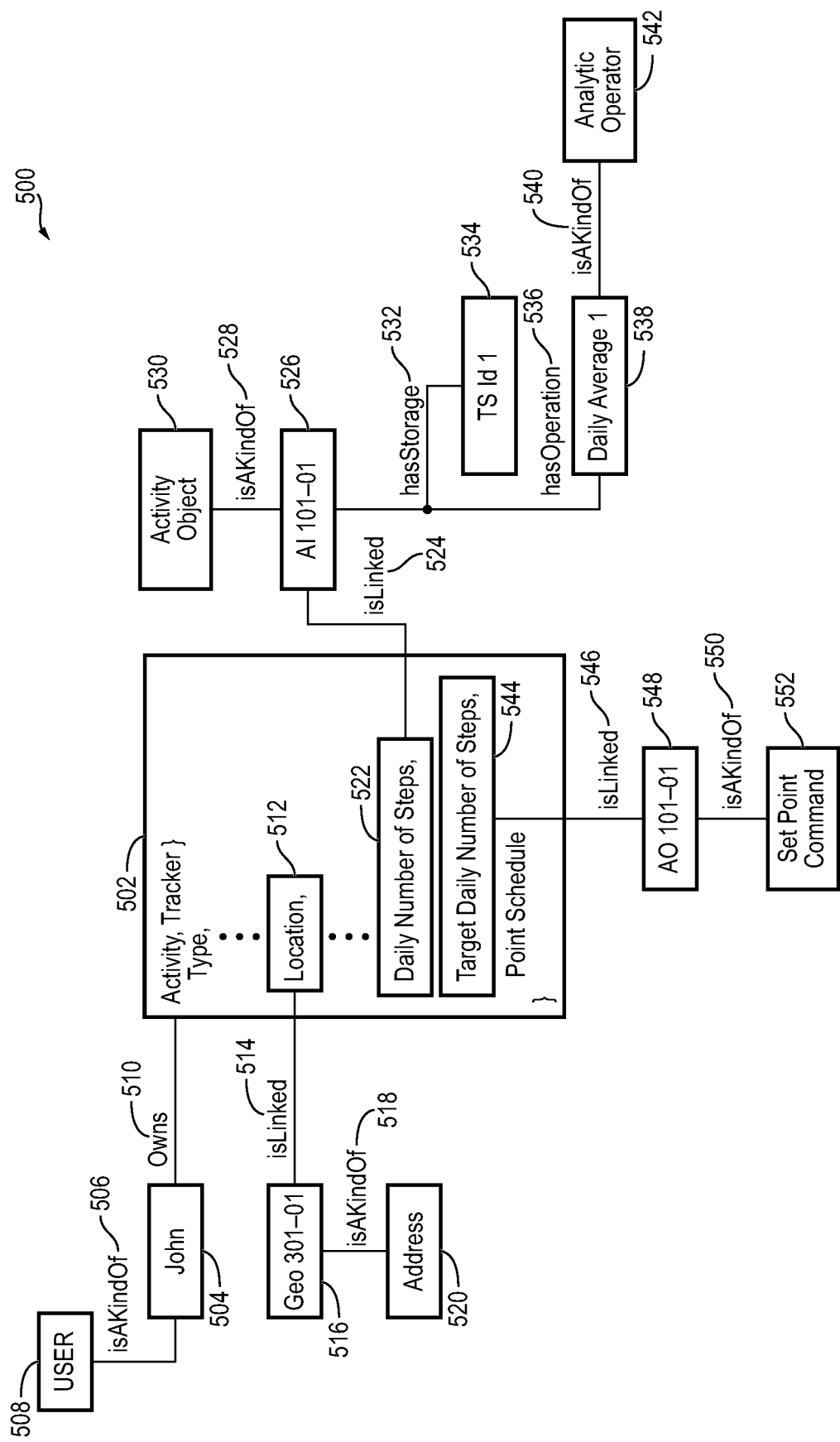
FIG. 5 in an example entity graph of entity data, according to some embodiments.

For example, referring to FIG. 5, an example entity graph of entity data is shown, according to some embodiments. The term "entity data" is used to describe the attributes of various entities and the relationships between the entities. For example, entity data may be represented in the form of an entity graph. In some embodiments, entity data includes any suitable predefined data models (e.g., as a table, JSON data, and/or the like), such as entity type or object, and further includes one or more relational objects that semantically define the relationships between the entities. The relational objects may help to semantically define, for example, hierarchical or directed relationships between the entities (e.g., entity X controls entity Y, entity A feeds entity B, entity 1 is located in entity 2, and the like). For example, an object entity (e.g., IoT device) may be represented by entity type or object, which generally describes how data corresponding to the entity will be structured and stored.

For example, an entity type (or object) "Activity Tracker" may be represented via the below schema:

```
Activity Tracker {
    Type,
    Model No,
    Device Name,
    Manufactured date,
    Serial number,
    MAC address,
    Location,
    Current Time,
    Current Date,
    Current Heart Rate,
    Daily Number of Steps,
    Target Daily Number of Steps,
    Point schedule
}
``` where various attributes are static attributes (e.g., "Type," "Model Number," "Device Name," etc.,), dynamic attributes (e.g., "Location," "Current Time," etc.), or behavioral attributes (e.g., "Current Heart Rate," "Daily Number of Steps," etc.) for the object entity "Activity Tracker." In a relational database, the object "Activity Tracker" is a table name, and the attributes represents column names.

An example of an object entity data model for a person named John Smith in a relational database may be represented by the below table:

| First Name | Last Name | Tel. No. | Age | Location | Job Title |
|---|---|---|---|---|---|
| John | Smith | (213)220-XXXX | 36 | Home | Engineer | where various attributes are static attributes (e.g., "First Name," "Last Name," etc.,), dynamic attributes (e.g., "Age," "Location," etc.), or behavioral attributes (e.g., "Engineer") for the object entity "John Smith."

An example data entity for the data point "Daily Number of Steps" for the "Activity Tracker" owned by John Smith in a relational database may be represented by the below table:

| Present-Value | Description | Device_Type | Unit of measure |
|---|---|---|---|
| 2365 | "John's current daily number of steps" | Activity Tracker | 2 feet/step | where various attributes are static attributes (e.g., "Description" and "Device_Type") and dynamic attributes (e.g., "Present-Value").

While structuring the entities via entity type or object may help to define the data representation of the entities, these data models do not provide information on how the entities relate to each other. For example, an IoT application, controller, or platform may need data from a plurality of sources as well as information on how the sources relate to each other in order to provide a proper decision, action, or recommendation. Accordingly, in various embodiments, the entity data further includes the relational objects to semantically define the relationships between the entities, which may help to increase speeds in analyzing data, as well as provide ease of navigation and browsing.

For example, still referring to FIG. 5, an entity graph 500 for the Activity Tracker object entity 502 includes various class entities (e.g., User, Address, SetPoint Command, and Activity Object), object entities (e.g., John and Activity Tracker), relational objects (e.g., isAKindOf, Owns, isLinked, hasStorage, and hasOperation), and data entities (AI 201-01, TS ID 1, Daily Average 1, AO 101-1, and Geo 301-01). The relational objects describe the relationships between the various class, object, and data entities in a semantic and syntactic manner, so that an application or user viewing the entity graph 500 can quickly determine the relationships and data process flow of the Activity Tracker object entity 502, without having to resort to a data base analyst or engineer to create, index, and/or manage the entities (e.g., using SQL or NoSQL). In some embodiments, each of the entities (e.g., class entity, object entity, and data entity) represents a node on the entity graph 500, and the relational objects define the relationships or connections between the entities (or nodes).

For example, the entity graph 500 shows that a person named John (object entity) 504 isAKindOf (relational object) 506 User (class entity) 508. John 504 Owns (relational object) 510 the Activity Tracker (object entity) 502. The Activity Tracker 502 has a location attribute (dynamic attribute) 512 that isLinked (relational object) 514 to Geo 301-01 (data entity) 316, which isAKindOf (relational object) 518 an Address (class entity) 520. Accordingly, Geo 301-01 316 should have a data point corresponding to an address.

The Activity Tracker 502 further includes a "Daily Number of Steps" attribute (dynamic attribute) 522 that isLinked (relational object) 524 to AI 201-01 (data entity) 526. AI 201-01 526 isAKindOf (relational object) 528 Activity Object (class entity) 530. Thus, AI 201-01 526 should contain some sort of activity related data. AI 201-01 526 hasStorage (relational object) 532 at TS ID 1 (data entity) 534. AI 201-01 526 hasOperation (relational object) 536 of Daily Average 1 (data entity) 538, which isAKindOf (relational object) 540 Analytic Operator (class entity) 542. Accordingly, Daily Average 1 should hold some data that is the result of an analytic operation.

In this example, the data entity AI 201-01 526 may be represented by the following data model:

```
point {
    name: "AI 201-01";
    type: "analog input";
    value: 2365;
    unit: "2 feet/step";
    source: "Pedometer Sensor 1"
}
``` where "point" is an example of a data entity that may be created by Cloud IoT platform Services 320 to hold the value for the linked "Daily Number of Steps" 522 dynamic attribute of the Activity Tracker entity 502, and source is the sensor or device in the Activity Tracker device 502 that provides the data to the linked "Daily Number of Steps" 522 dynamic attribute.

The data entity TS Id 1 534 may be represented, for example, by the following data model:

```
timeseries {
    name: "TS Id 1";
    type: "Daily Average";
    values: "[2365, 10683, 9166, 8254, 12982];
    unit: "2 feet/step";
    point: "AI 201-01";
    source: "Daily Average 1"
}
``` where the data entity Daily Average 1 538 represents a specific analytic operator used to create the data entity for the average daily timeseries TS Id 1 534 based on the values of the corresponding data entity for point AI 201-01 526. The relational object hasOperation shows that the AI 201-01 data entity 526 is used as an input to the specific logic/math operation represented by Daily Average 1 538. TS Id 1 534 might also include an attribute that identifies the analytic operator Daily Average 1 538 as the source of the data samples in the timeseries.

Still referring to FIG. 5, the entity graph 500 for Activity Tracker 502 shows that the "Target Daily Number of Steps" attribute (dynamic attribute) 544 isLinked (relational attribute) 546 to the data entity AO 101-01 (data entity) 548. AO 101-01 data entity isAKindOf (relational attribute) 550 a SetPoint Command (class entity) 552. Thus, the data in data entity AO 101-01 548 may be set via a command by the user or other entity. Accordingly, in various embodiments, entity graph 500 provides a user friendly view of the various relationships between the entities (or nodes) and data processing flow, which provides for ease of navigation, browsing, and analysis of data.

In some embodiments, any two entities (or nodes) can be connected to each other via one or more relational objects that define different relationships between the two entities (or nodes). For example, still referring to FIG. 5, the object entity John 504 is shown to be connected to the object entity Activity Tracker 502 via one relational object Owns 510. However, in another embodiment, the object entity John 504 can be connected to the object entity Activity Tracker 502 via more than one relational object, such that, in addition to the relational object Owns 510, another relational object can define another relationship between the object entity John 504 and the object entity Activity Tracker 502. For example, another relational object such as isWearing or isNotWearing can define whether or not John (or the entity object for John 504) is currently wearing (e.g., via the relational object isWearing) or currently not wearing (e.g., via the relational object isNotWearing) the activity tracker (or the entity object for the activity tracker 502).

In this case, when the data entities associated with the activity tracker object entity 502 indicates that John is wearing the activity tracker (e.g., which may be determined from the daily number of steps attribute 522 or the location attribute 512), the relational object isWearing may be created between the object entity for John 510 and the object entity for activity tracker 502. On the other hand, when the data entities associated with the activity tracker object entity 502 indicates that John is not wearing the activity tracker (e.g., which may be determined when the daily number of steps attribute 522 for a current day is zero or the location attribute 512 shows a different location from a known location of John), the relational object isNotWearing can be created between the object entity for John 510 and the object entity for activity tracker 502. For example, the relational object isNotWearing can be created by modifying the relational object isWearing or deleting the relational object isWearing and creating the relational object isNotWearing. Thus, in some embodiments, the relational objects can be dynamically created, modified, or deleted as needed or desired.

Referring again to FIG. 4, entity service 326 may transforms raw data samples and/or raw timeseries data into data corresponding to entity data. For example, as discussed above with reference to FIG. 5, entity service 326 can create data entities that use and/or represent data points in the timeseries data. Entity service 326 includes a web service 402, a registration service 404, a management service 406, a transformation service 408, a search service 410, and storage 412. In some embodiments, storage 412 may be internal storage or external storage. For example, storage 412 may be storage 314 (see FIG. 3), internal storage with relation to entity service 326, and/or may include a remote database, cloud-based data hosting, or other remote data storage.

Web service 402 can be configured to interact with web-based applications to send entity data and/or receive raw data (e.g., data samples, timeseries data, and the like). For example, web service 402 can provide an interface (e.g., API, UI/UX, and the like) to manage (e.g., register, create, edit, delete, and/or update) an entity (e.g., class entity, object entity, data entity, and/or the like) and the relational objects that define the relationships between the entities. In some embodiments, web service 402 provides entity data to web-based applications. For example, if one or more of applications 330 are web-based applications, web service 402 can provide entity data to the web-based applications. In some embodiments, web service 402 receives raw data samples and/or raw timeseries data including device information from a web-based data collector, or a web-based security service to identify authorized entities and to exchange secured messages. For example, if data collector 312 is a web-based application, web service 402 can receive the raw data samples and/or timeseries data including a device attribute indicating a type of device (e.g., IoT device) from which the data samples and/or timeseries data are received from data collector 312. In some embodiments, web service 402 may message security service 322 to request authorization information and/or permission information of a particular entity or device. In some embodiments, the entity service 326 processes and transforms the collected data to generate the entity data.

The registration service 404 can perform registration of devices and entities. For example, registration service 404 can communicate with IoT devices 228 and client devices 248 (e.g., via web service 402) to register each IoT device with Cloud IoT platform services 320. In some embodiments, registration service 404 registers a particular IoT device 228 with a specific user and/or a specific set of permissions and/or entitlements. For example, a user may register a device key and/or a device ID associated with the IoT device 228 via a web portal (e.g., web service 402). In some embodiments, the device ID and the device key may be unique to the IoT device 228. The device ID may be a unique number associated with the device such as a unique alphanumeric string, a serial number of IoT device 228, and/or any other static identifier. In various embodiments, IoT device 228 is provisioned by a manufacturer and/or any other entity. In various embodiments, the device key and/or device ID are saved to IoT device 228 based on whether IoT device 228 includes a trusted platform module (TPM). If the IoT device 228 includes a TPM, the IoT device 228 may store the device key and/or device ID according to the protocols of the TPM. If the IoT device 228 does not include a TPM, the IoT device 228 may store the device key and/or device ID in a file and/or file field which may be stored in a secure storage location. Further, in some embodiments, the device ID may be stored with BIOS software of the IoT device 228. For example, a serial number of BIOS software may become and/or may be updated with the device ID.

In various embodiments, the device key and/or the device ID are uploaded to registration service 404 (e.g., an IoT hub such as AZURE® IoT Hub). In some embodiments, registration service 404 is configured to store the device key and the device ID in secure permanent storage and/or may be stored by security service 322 (e.g., by a security API). In some embodiments, a manufacturer and/or any other individual may register the device key and the device ID with registration service 404 (e.g., via web service 402). In various embodiments, the device key and the device ID are linked to a particular profile associated with the IoT device 228 and/or a particular user profile (e.g., a particular user). In this regard, a device (e.g., IoT device 228) can be associated with a particular user. In various embodiments, the device key and the device ID make up the profile for IoT device 228. The profile may be registered as a device that has been manufactured and/or provisioned but has not yet been purchased by an end user.

In various embodiments, registration service 404 adds and/or updates a device in an IoT hub device registry. In various embodiments, registration service 404 may determine if the device is already registered, can set various authentication values (e.g., device ID, device key), and can update the IoT hub device registry. In a similar manner, registration service 404 can update a document database with the various device registration information.

In some embodiments, registration service 404 can be configured to create a virtual representation (e.g., "digital twins" or "shadow records") of each IoT device in an IoT environment within Cloud IoT platform services 320. In some embodiments, the virtual device representations are smart entities that include attributes defining or characterizing the corresponding physical IoT devices and are associated to the corresponding physical IoT devices via relational objects defining the relationship of the IoT device and the smart entity representation thereof. In some embodiments, the virtual device representations maintain shadow copies of the IoT devices with versioning information so that Cloud entity service 326 can store not only the most recent update of an attribute (e.g., a dynamic attribute) associated with the IoT device, but records of previous states of the attributes (e.g., dynamic attributes) and/or entities. For example, the shadow record may be created as a type of data entity that is related to a linked data entity corresponding to the dynamic attribute of the object entity (e.g., IoT device). For example, the shadow entity may be associated with the linked data entity via a relational object (e.g., isLinked, hasStorage, hasOperation, and the like). In this case, the shadow entity may be used to determine additional analytics for the data point of the dynamic attribute. For example, the shadow entity may be used to determine an average value, and expected value, or an abnormal value of the data point from the dynamic attribute.

Management service 406 may create, modify, or update various attributes, data entities, and/or relational objects of the devices managed by Cloud IoT platform services 326 for each entity rather than per class or type of entity. This allows for separate processing/analytics for each individual entity rather than only to a class or type of entity. Some attributes (or data entities) may correspond to, for example, the most recent value of a data point provided to Cloud IoT platform services 326 via the raw data samples and/or timeseries data. For example, the "Daily Number of Steps" dynamic attribute of the "Activity Tracker" object entity 502 in the example discussed above may be the most recent value of a number of steps data point provided by the Activity Tracker device. Management service 406 can use the relational objects of the entity data for Activity Tracker to determine where to update the data of the attribute.

For example, Management service 406 may determine that a data entity (e.g., AI 201-01) is linked to the "Daily Number of Steps" dynamic attribute of Activity Tracker via an isLinked relational object. In this case, Management service 406 may automatically update the attribute data in the linked data entity. Further, if a linked data entity does not exist, Management service 406 can create a data entity (e.g., AI 201-01) and an instance of the isLinked relational object 524 to store and link the "Daily Number of Steps" dynamic attribute of Activity Tracker therein. Accordingly, processing/analytics for activity tracker 502 may be automated. As another example, a "most recent view" attribute (or linked data entity) of a webpage object entity may indicate the most recent time at which the webpage was viewed. Management service 406 can use the entity data from a related click tracking system object entity or web server object entity to determine when the most recent view occurred and can automatically update the "most recent view" attribute (or linked data entity) of the webpage entity accordingly.

Other data entities and/or attributes may be created and/or updated as a result of an analytic, transformation, calculation, or other processing operation based on the raw data and/or entity data. For example, Management service 406 can use the relational objects in entity data to identify a related access control device (e.g., a card reader, a keypad, etc.) at the entrance/exit of a building object entity. Management service 406 can use raw data received from the identified access control device to track the number of occupants entering and exiting the building object entity (e.g., via related card entities used by the occupants to enter and exit the building). Management service 406 can update a "number of occupants" attribute (or corresponding data entity) of the building object entity each time a person enters or exits the building using a related card object entity, such that the "number of occupants" attribute (or data entity) reflects the current number of occupants within the building (or related building object entity). As another example, a "total revenue" attribute associated with a product line object entity may be the summation of all the revenue generated from related point of sales entities. Management service 406 can use the raw data received from the related point of sales entities to determine when a sale of the product occurs, and can identify the amount of revenue generated by the sales. Management service 406 can then update the "total revenue" attribute (or related data entity) of the product line object entity by adding the most recent sales revenue from each of the related point of sales entities to the previous value of the attribute.

In some embodiments, management service 406 uses entity data and/or raw data from multiple different data sources to update the attributes (or corresponding data entities) of various object entities. For example, an object entity representing a person (e.g., a person's cellular device or other related object entity) may include a "risk" attribute that quantifies the person's level of risk attributable to various physical, environmental, or other conditions. Management service 406 can use relational objects of the person object entity to identify a related card device and/or a related card reader from a related building object entity (e.g., the building in which the person works) to determine the physical location of the person at any given time. Management service 406 can use weather data from a weather service in the region in which the building object entity is located to determine whether any severe weather is approaching the person's location. Similarly, management service 406 can use building data from related building entities of the building object entity to determine whether the building in which the person is located is experiencing any emergency conditions (e.g., fire, building lockdown, etc.) or environmental hazards (e.g., detected air contaminants, pollutants, extreme temperatures, etc.) that could increase the person's level of risk. Management service 406 can use these and other types of data as inputs to a risk function that calculates the value of the person object entity's "risk" attribute and can update the person object entity (or related device entity of the person) accordingly.

In some embodiments, management service 406 can be configured to synchronize configuration settings, parameters, and other device-specific information between the entities and Cloud IoT platform services 320. In some embodiments, the synchronization occurs asynchronously. Management service 406 can be configured to manage device properties dynamically. The device properties, configuration settings, parameters, and other device-specific information can be synchronized between the smart entities created by and stored within Cloud IoT platform services 320.

In some embodiments, management service 406 is configured to manage a manifest for each of the IoT devices. The manifest may include a set of relationships between the IoT devices and various entities. Further, the manifest may indicate a set of entitlements for the IoT devices and/or entitlements of the various entities and/or other entities. The set of entitlements may allow an IoT device and/or a user of the device to perform certain actions within the IoT environment (e.g., control, configure, monitor, and/or the like).

Still referring to FIG. 4, transformation service 408 can provide data virtualization, and can transform various predefined standard data models for entities in a same class or type to have the same entity data structure, regardless of the device or Thing that the entity represents. For example, each device entity under a device class may include a location attribute, regardless of whether or not the location attribute is used. Thus, if an application is later developed requiring that each device entity includes a location attribute, manual mapping of heterogenous data of different entities in the same class may be avoided. Accordingly, interoperability between IoT devices and scalability of IoT applications may be improved.

In some embodiments, transformation service 408 can provide entity matching, cleansing, and correlation so that a unified cleansed view of the entity data including the entity related information (e.g., relational objects) can be provided. Transformation service 408 can support semantic and syntactic relationship description in the form of standardized relational objects between the various entities. This may simplify machine learning because the relational objects themselves provide all the relationship description between the other entities. Accordingly, the rich set of pre-built entity models and standardized relational objects may provide for rapid application development and data analytics.

Figure 6:
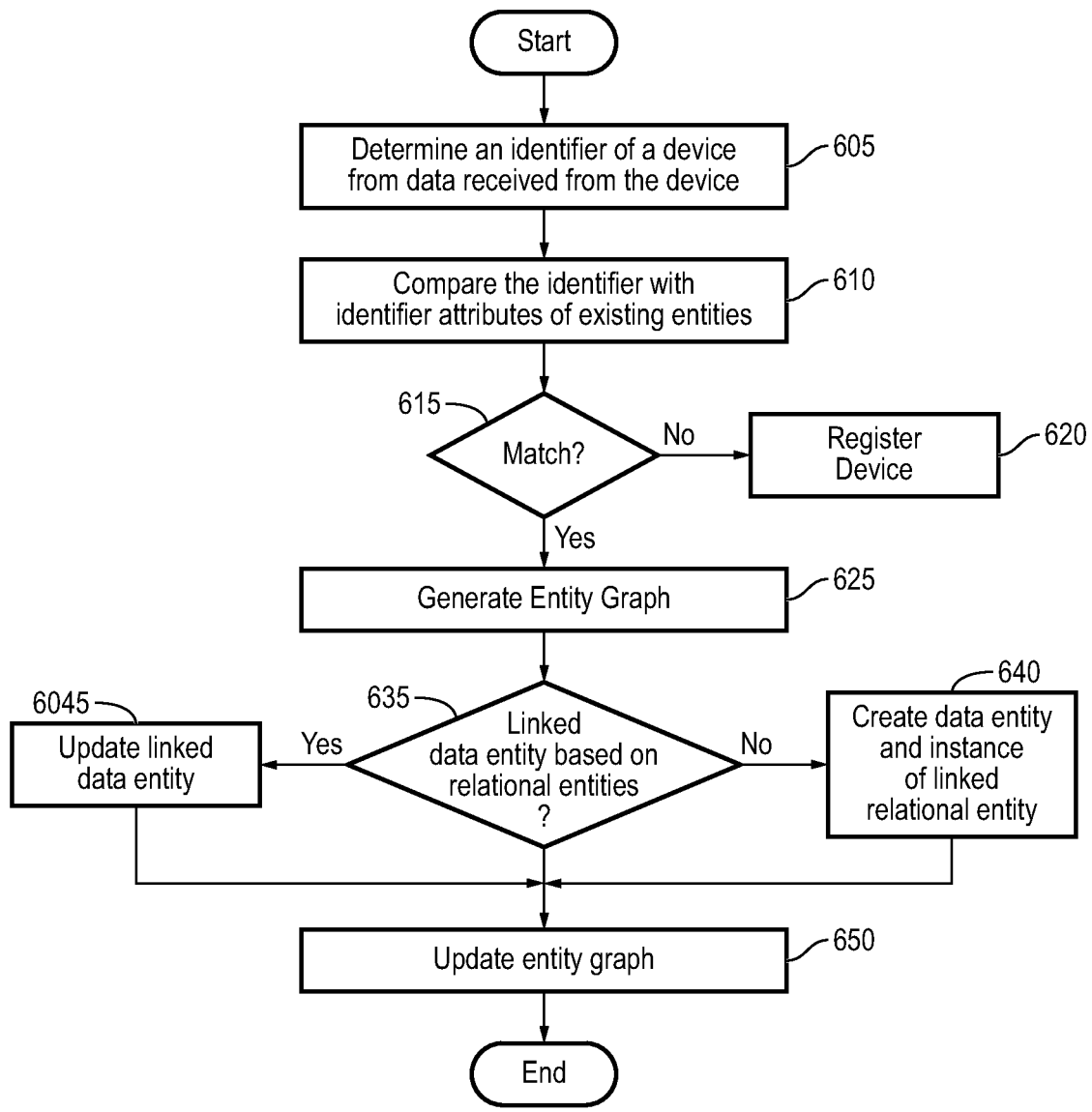
FIG. 6 is a flow diagram of a process or method for updating/creating an attribute of a related entity based on data received from a device, according to some embodiments.

For example, FIG. 6 shows a flow diagram of a process or method for updating/creating a data entity based on data received from a device, according to some embodiments. Referring to FIG. 6, the process starts, and when raw data and/or timeseries data is received from an IoT device, the transformation service 407 may determine an identifier of the IoT device from the received data at block 605. At block 610, the transformation service 407 may compare an identity static attribute from the data with identity static attributes of registered object entities to locate a data container for the IoT device. If a match does not exist from the comparison at block 615, the transformation service 407 may invoke the registration service to register the IoT device at block 620. If a match exists from the comparison at block 615, the transformation service 407 may generate an entity graph or retrieve entity data for the device at block 625. From the entity graph or entity data, transformation service 407 may determine if a corresponding data entity exists based on the relational objects (e.g., isLinked) for the IoT device to update a dynamic attribute from the data at block 625. If not, management service 406 may create a data entity for the dynamic attribute and an instance of a corresponding relational object (e.g., isLinked) to define the relationship between the dynamic attribute and created data entity at block 640. If the corresponding data entity exists, management service 406 may update the data entity corresponding to the dynamic attribute from the data at block 645. Then, transformation service 470 may update or regenerate the entity graph or entity data at block 650, and the process may end.

Referring again to FIG. 4, the search service 410 provides a unified view of product related information in the form of the entity graph, which correlates entity relationships (via relational objects) among multiple data sources (e.g., CRM, ERP, MRP and the like). In some embodiments, the search service 410 is based on a schema-less and graph based indexing architecture. For example, in some embodiments, the search service 410 provides the entity graph in which the entities are represented as nodes with relational objects defining the relationship between the entities (or nodes). The search service 410 facilitates simple queries without having to search multiple levels of the hierarchical tree of the entity graph. For example, search service 410 can return results based on searching of entity type, individual entities, attributes, or even relational objects without requiring other levels or entities of the hierarchy to be searched.

Figure 7:
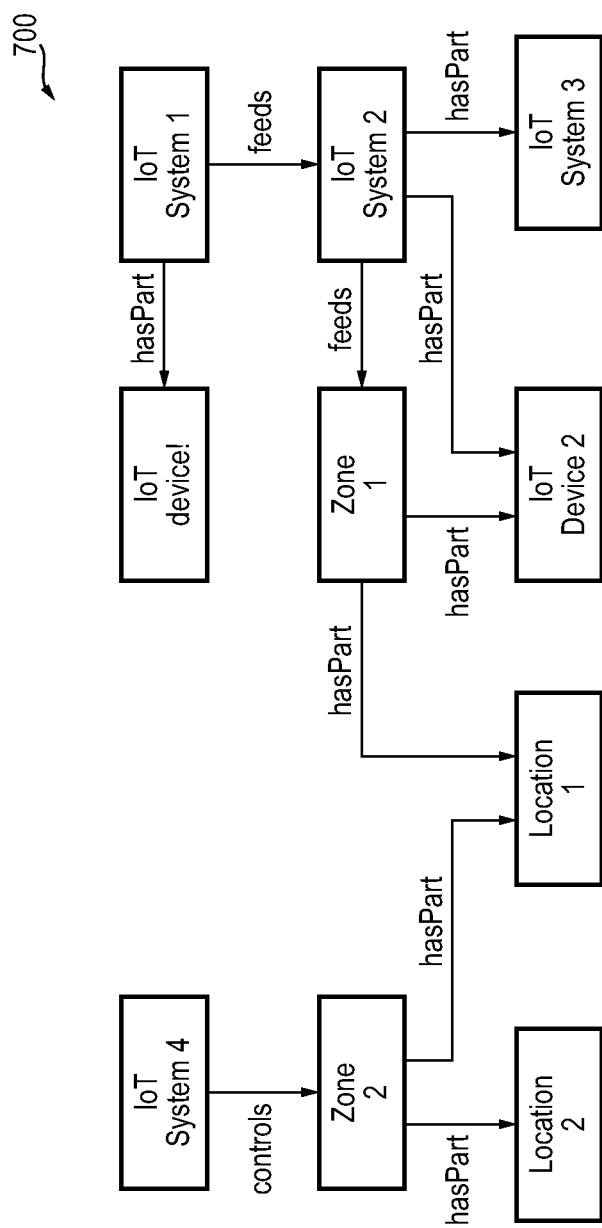
FIG. 7 is an example entity graph of entity data, according to some embodiments.

FIG. 7 is an example entity graph of entity data according to an embodiment of the present disclosure. The example of FIG. 7 assumes that a fault based application has detected a faulty measurement with respect to IoT device 2. However, IoT device 2 relies on various other systems and devices in order to operate properly. Thus, while the faulty measurement was detected with respect to IoT device 2, IoT device 2 itself may be operating properly. Accordingly, in order to pin point the cause of the faulty measurement, the fault based application may require additional information from various related IOT systems and devices (e.g., entity objects), as well as the zones and locations (e.g., entity objects) that the systems and devices are configured to serve, in order to properly determine or infer the cause of the faulty measurement.

Referring to FIG. 7, entity graph 700 represents each of the entities (e.g., IoT device 2 and other related entities) as nodes on the entity graph 700, and shows the relationship between IoT device 2 and related entities via relational objects (e.g., Feeds, hasPoint, hasPart, Controls, etc.). For example, entity graph 700 shows that the entities related to IoT device 2 include a plurality of IoT systems 1-4, IoT device 1, zones 1 and 2, and locations 1 and 2, each represented as a node on the entity graph 700. Further, the relational objects indicate that IoT device 2 provides a data point (e.g., hasPoint) to zone 1. Zone 1 is shown to service location 1 (e.g., hasPart), which is also serviced by zone 2 (e.g., hasPart). Zone 2 also services location 2 (e.g., hasPart), and is controlled by IoT system 4 (e.g., controls). IoT device 2 is shown to also provide a data point (e.g., hasPoint) to IoT system 2. IoT system 2 is shown to include IoT system 3 (e.g., hasPart), and feeds (e.g., Feeds) zone 1. Further, IoT system 2 is fed (e.g., Feeds) by IoT system 1, which receives a data point (e.g., hasPoint) from IoT device 1.

Accordingly, in the example of FIG. 7, in response to receiving the faulty measurement from IoT device 2, the fault based application and/or analytics service 324 can determine from the entity graph that the fault could be caused by some malfunction in one or more of the other related entities, and not necessarily a malfunction of the IoT device 2. Thus, the fault based application and/or the analytics service 324 can investigate into the other related entities to determine or infer the most likely cause of the fault.

Figure 8:
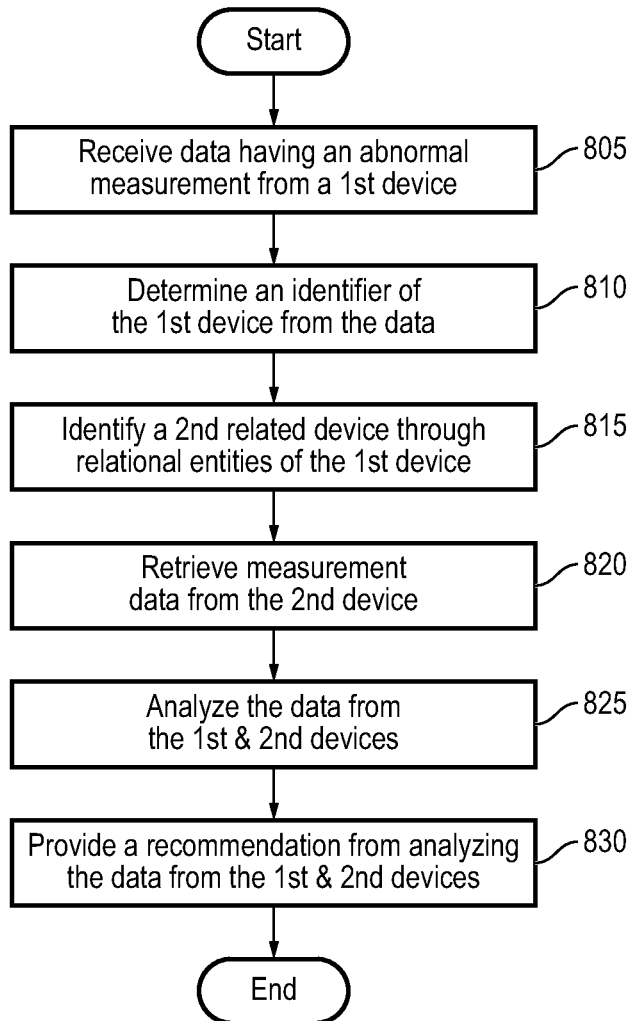
FIG. 8 is a flow diagram of a process or method for analyzing data from a second related device based on data from a first device, according to some embodiments.

For example, FIG. 8 is a flow diagram of a process or method for analyzing data from a second related device based on data from a first device, according to some embodiments. Referring to FIG. 8, the process starts and data including an abnormal measurement is received from a first device at block 805. Transformation service 407 determines an identifier of the first device from the received data at block 810. Transformation service 407 identifies a second device related to the first device through relational objects associated with the first device at block 815. Transformation service 407 invokes web service 402 to retrieve measurement data from the second device at block 820. Analytics service 324 analyzes the data from the first device and the second device at block 825. Analytics service 324 provides a recommendation from the analysis of the data from each of the first device and the second device at block 830, and the process ends.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

In various implementations, the steps and operations described herein may be performed on one processor or in a combination of two or more processors. For example, in some implementations, the various operations could be performed in a central server or set of central servers configured to receive data from one or more devices (e.g., edge computing devices/controllers) and perform the operations. In some implementations, the operations may be performed by one or more local controllers or computing devices (e.g., edge devices), such as controllers dedicated to and/or located within a particular building or portion of a building. In some implementations, the operations may be performed by a combination of one or more central or offsite computing devices/servers and one or more local controllers/computing devices. All such implementations are contemplated within the scope of the present disclosure. Further, unless otherwise indicated, when the present disclosure refers to one or more computer-readable storage media and/or one or more controllers, such computer-readable storage media and/or one or more controllers may be implemented as one or more central servers, one or more local controllers or computing devices (e.g., edge devices), any combination thereof, or any other combination of storage media and/or controllers regardless of the location of such devices.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A web platform comprising:
    one or more computer readable storage media storing instructions thereon that, when executed by one or more processors, cause the one or more processors to:
        generate a database of digital twins, the database of digital twins comprising sensor digital twins representing sensors of an environment, data entities representing measurements received from the sensors, and relational objects indicating relationships between the digital twins and the data entities, the relational objects including a plurality of semantic relationship types;
        receive a new measurement from a sensor of the sensors;
        identify a data entity of the data entities by identifying a relational object of the relational objects including a particular semantic relationship type of the plurality of semantic relationship types between a sensor digital twin of the sensor digital twins representing the sensor and the data entity; and
        in response to identifying that the data entity is related to the sensor digital twin representing the sensor by the relational object including the particular semantic relationship type, modify the data entity to include or be associated with the new measurement received from the sensor.

2. The web platform of claim 1, wherein the instructions cause the one or more processors to:
    periodically receive new measurements from the sensor; and
    update the data entity each time a particular new measurement from the sensor is received.

3. The web platform of claim 1, further comprising:
    the sensor configured to send the new measurement to a cloud computing system of the web platform in response to detecting an event;
    wherein the instructions cause the one or more processors to update the data entity to include a data value representative of the event.

4. The web platform of claim 1, wherein the new measurement from the sensor is received in a first protocol or format;
    wherein the instructions cause the one or more processors to:
        receive a second new measurement from a second sensor of the sensors, wherein the new measurement from the second sensor is received in a second protocol or format;
        convert the new measurement from the sensor from the first protocol or format into a third protocol or format; and
        convert the second new measurement from the second sensor from the second protocol or format into the third protocol or format.

5. The web platform of claim 1, wherein the sensor digital twins include static attributes identifying the sensors represented by the sensor digital twins and dynamic attributes storing a most recent measurement received from the sensors.

6. The web platform of claim 1, wherein the data entity includes a static attribute identifying the sensor and a dynamic attribute storing a most recent measurement received from the sensor.

7. The web platform of claim 1, wherein the relational objects include attributes identifying the sensor digital twins and second attributes identifying the data entities.

8. The web platform of claim 1, wherein the instructions cause the one or more processors to modify the data entity by:
    using an attribute of the new measurement received from the sensor to identify the sensor digital twin associated with the sensor;
    identifying the relational object connecting the sensor digital twin to the data entity; and
    storing a value of the new measurement received from the sensor in the data entity identified by the relational object.

9. The web platform of claim 1, wherein the data entity includes or is associated with a plurality of past measurements received from the sensor.

10. A method comprising:
    generating, by one or more processing circuits, a database of digital twins, the database of digital twins comprising sensor digital twins representing sensors of an environment, data entities representing measurements received from the sensors, and relational objects indicating relationships between the digital twins and the data entities, the relational objects including a plurality of semantic relationship types;

receiving, by the one or more processing circuits, a new measurement from a sensor of the sensors;

identifying, by the one or more processing circuits, a data entity of the data entities by identifying a relational object of the relational objects including a particular semantic relationship type of the plurality of semantic relationship types between a sensor digital twin of the sensor digital twins representing the sensor and the data entity; and in response to identifying that the data entity is related to the sensor digital twin representing the sensor by the relational object including the particular semantic relationship type, modifying, by the one or more processing circuits, the data entity to include or be associated with the new measurement received from the sensor.

11. The method of claim 10, further comprising:
periodically receiving, by the one or more processing circuits, new measurements from the sensor; and
updating, by the one or more processing circuits, the data entity each time a particular new measurement from the sensor is received.

12. The method of claim 10, further comprising:
receiving, by the one or more processing circuits, the new measurement from the sensor in response to the sensor detecting an event; and
updating, by the one or more processing circuits, the data entity to include a data value representative of the event.

13. The method of claim 10, wherein the new measurement from the sensor is received in a first protocol or format; the method comprising:
receiving, by the one or more processing circuits, a second new measurement from a second sensor of the sensors, wherein the new measurement from the second sensor is received in a second protocol or format;
converting, by the one or more processing circuits, the new measurement from the sensor from the first protocol or format into a third protocol or format; and
converting, by the one or more processing circuits, the second new measurement from the second sensor from the second protocol or format into the third protocol or format.

14. The method of claim 10, wherein the sensor digital twins include static attributes identifying the sensors represented by the sensor digital twins and dynamic attributes storing a most recent measurement received from the sensors.

15. The method of claim 10, wherein the data entity includes a static attribute identifying the sensor and a dynamic attribute storing a most recent measurement received from the sensor.

16. The method of claim 10, wherein the relational objects include attributes identifying the sensor digital twins and second attributes identifying the data entities.

17. The method of claim 10, wherein modifying, by the one or more processing circuits, the data entity comprises:
using an attribute of the new measurement received from the sensor to identify the sensor digital twin associated with the sensor;
identifying the relational object connecting the sensor digital twin to the data entity; and
storing a value of the new measurement received from the sensor in the data entity identified by the relational object.

18. One or more computer-readable storage media having instructions stored thereon that, when executed by one or more processors, cause the one or more processors to:
generate a database of digital twins, the database of digital twins comprising sensor digital twins representing sensors of an environment, data entities representing measurements received from the sensors, and relational objects indicating relationships between the sensor digital twins and the data entities, the relational objects including a plurality of semantic relationship types;
receive a new measurement from a sensor;
identify a data entity of the data entities by identifying a relational object of the relational objects including a particular semantic relationship type of the plurality of semantic relationship types between a sensor digital twin of the sensor digital twins representing the sensor and the data entity; and
in response to identifying that the data entity is related to the sensor digital twin representing the sensor by the relational object including the particular semantic relationship type, modify the data entity to include or be associated with the new measurement received from the sensor.

19. The one or more computer-readable storage media of claim 18, wherein the data entity includes a static attribute identifying the sensor and a dynamic attribute storing a most recent measurement received from the sensor.

* * * * *